United States Patent
Cursetjee et al.

(10) Patent No.: US 8,087,492 B2
(45) Date of Patent: Jan. 3, 2012

(54) METHODS AND SYSTEMS FOR INTEGRATING SOUND ATTENUATION INTO A FILTER BANK

(75) Inventors: Zareer Cursetjee, Clackamas, OR (US); David L. Baugh, Newberg, OR (US); David E. Benson, West Linn, OR (US)

(73) Assignee: Huntair, Inc., Tualatin, OR (US)

( * ) Notice: Subject to any disclaimer, the term of this patent is extended or adjusted under 35 U.S.C. 154(b) by 0 days.

(21) Appl. No.: 12/719,607

(22) Filed: Mar. 8, 2010

(65) Prior Publication Data

US 2011/0214935 A1   Sep. 8, 2011

(51) Int. Cl.
*E04F 17/04* (2006.01)
*F01N 13/00* (2010.01)

(52) U.S. Cl. .................. 181/224; 181/225; 181/258

(58) Field of Classification Search .......... 181/224, 181/225, 226, 258, 231; 454/262, 206, 207, 454/346, 906
See application file for complete search history.

(56) References Cited

U.S. PATENT DOCUMENTS

| | | | | |
|---|---|---|---|---|
| 1,729,027 A | * | 9/1929 | Brennan | 181/258 |
| 1,891,170 A | * | 12/1932 | Nose et al. | 60/295 |
| 1,967,838 A | * | 7/1934 | Norris | 454/206 |
| 2,051,613 A | * | 8/1936 | Macleod | 454/206 |
| 2,207,770 A | * | 7/1940 | Andersen | 454/207 |
| 3,752,226 A | | 8/1973 | Bullock | |
| 3,811,531 A | * | 5/1974 | Forssman | 181/258 |
| 3,842,932 A | * | 10/1974 | Gibel | 181/258 |
| 4,116,269 A | * | 9/1978 | Ikeda | 165/126 |
| 4,124,091 A | * | 11/1978 | Mizusawa | 181/231 |
| 4,316,522 A | | 2/1982 | Hirschorn | |
| 4,334,588 A | * | 6/1982 | Tezuka et al. | 180/68.6 |
| 4,432,434 A | | 2/1984 | Dean | |
| 4,660,676 A | * | 4/1987 | Eustace | 181/224 |
| 4,693,337 A | * | 9/1987 | Timmermeister | 181/231 |
| 4,712,643 A | * | 12/1987 | Iles et al. | 181/231 |
| 4,810,269 A | * | 3/1989 | Stackhouse et al. | 96/381 |
| 5,036,931 A | * | 8/1991 | Iritani | 180/68.1 |
| 5,164,550 A | * | 11/1992 | Beidl et al. | 181/229 |
| 5,248,859 A | * | 9/1993 | Borla | 181/238 |

(Continued)

FOREIGN PATENT DOCUMENTS

CA   2 520 211   3/2006

(Continued)

OTHER PUBLICATIONS

Extended Search Report for counterpart EP 11250024.4, dated Nov. 2, 2011.

*Primary Examiner* — Edgardo San Martin
(74) *Attorney, Agent, or Firm* — Joseph M. Butscher; The Small Patent Law Group, LLC

(57) ABSTRACT

A filter bank is provided. The filter bank includes a housing having a front face and a back face. Air flows along an air flow path from the front face to the back face. A filter layer is held in the housing. The filter layer is oriented between the front and back faces such that air flows through the filter layer before discharging from the back face. An attenuation layer is positioned within the housing to attenuate sound as the sound propagates between the front and back faces. The attenuation layer is oriented to extend along the air flow direction.

41 Claims, 20 Drawing Sheets

U.S. PATENT DOCUMENTS

| | | | |
|---|---|---|---|
| 5,297,990 A * | 3/1994 | Renz et al. | 454/187 |
| 5,332,872 A * | 7/1994 | Ewanek | 181/224 |
| 5,462,484 A | 10/1995 | Jung | |
| 5,468,923 A * | 11/1995 | Kleyn | 181/282 |
| 5,471,537 A * | 11/1995 | Castwall | 381/71.3 |
| 5,473,123 A | 12/1995 | Yazici et al. | |
| 5,518,451 A | 5/1996 | Renz | |
| 5,625,172 A | 4/1997 | Blichmann | |
| 5,792,229 A | 8/1998 | Sassa | |
| 5,979,595 A * | 11/1999 | Harris | 181/214 |
| 6,174,342 B1 * | 1/2001 | Jeanseau | 55/385.2 |
| 6,402,612 B2 * | 6/2002 | Akhtar et al. | 181/224 |
| 6,524,064 B2 * | 2/2003 | Chou et al. | 415/119 |
| 6,668,970 B1 | 12/2003 | Lee | |
| 6,702,880 B2 * | 3/2004 | Roberts et al. | 181/231 |
| 7,183,500 B2 * | 2/2007 | Campini et al. | 174/392 |
| 7,431,127 B2 * | 10/2008 | de Borchgrave et al. | 181/229 |
| 7,581,619 B1 | 9/2009 | Storm | |
| 2008/0139107 A1 * | 6/2008 | Takeda et al. | 454/262 |
| 2008/0311840 A1 | 12/2008 | Rainey et al. | |
| 2010/0307862 A1 * | 12/2010 | Yamauchi et al. | 181/224 |

FOREIGN PATENT DOCUMENTS

| | | |
|---|---|---|
| DE | 4037287 A1 * | 7/1991 |
| DE | 196 23 708 | 12/1997 |
| DE | 100 47 068 | 4/2002 |
| FR | 2700203 A1 * | 7/1994 |
| GB | 667055 | 2/1962 |
| GB | 2229266 A * | 9/1990 |
| GB | 2 361 050 | 10/2001 |
| WO | WO 2009/041937 | 4/2009 |

* cited by examiner

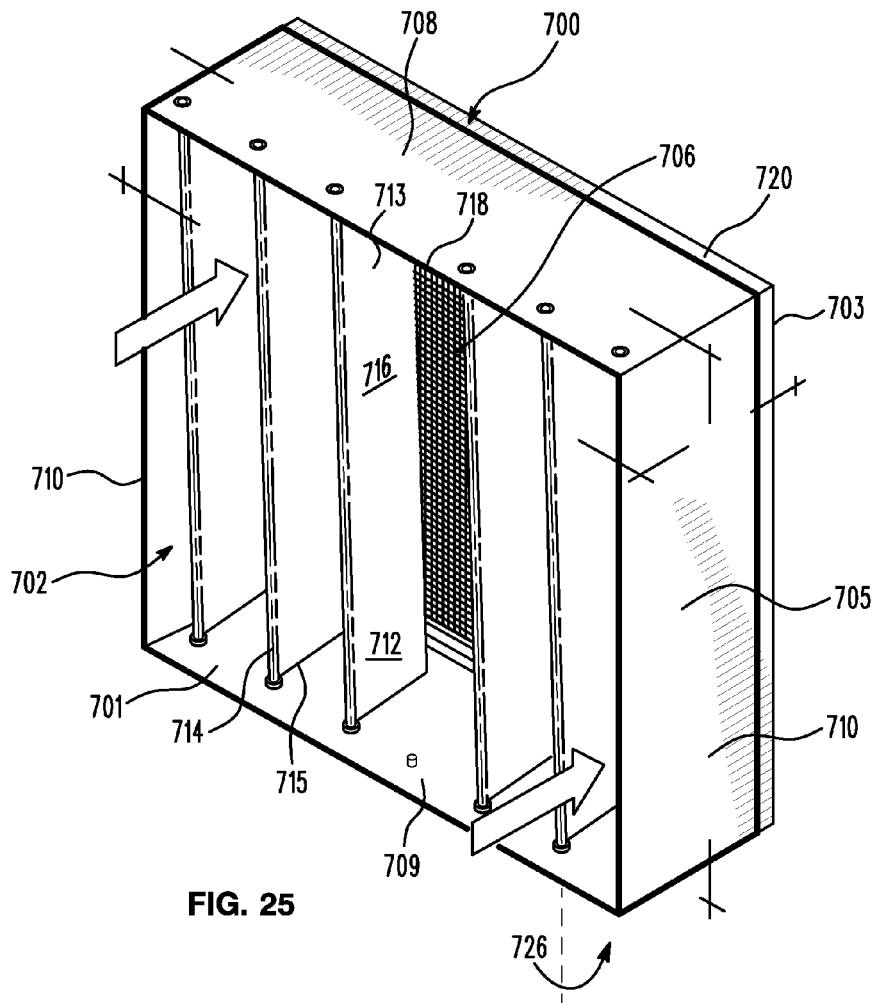
FIG. 25
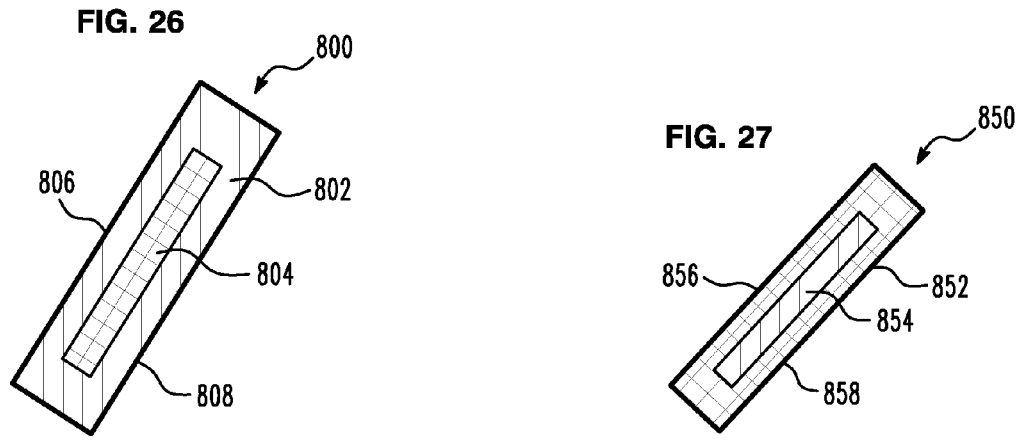
FIG. 26
FIG. 27

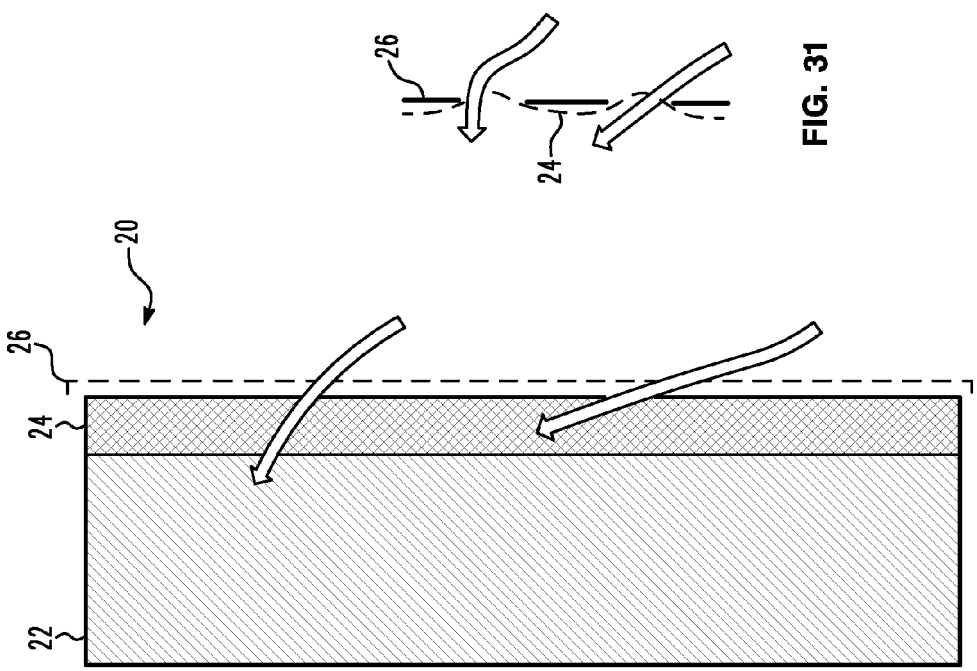
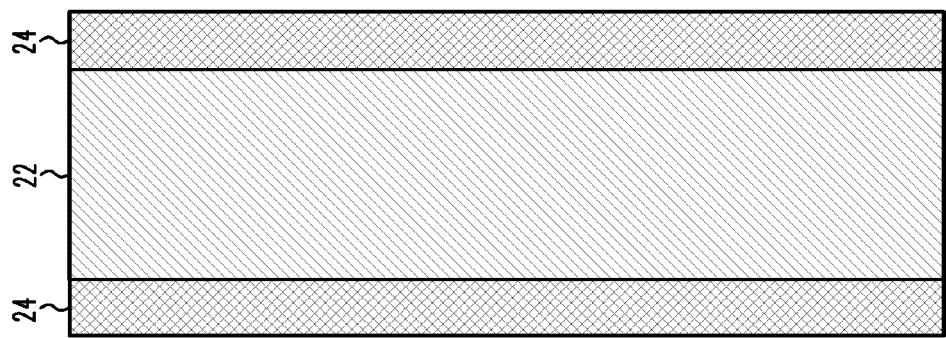

METHODS AND SYSTEMS FOR INTEGRATING SOUND ATTENUATION INTO A FILTER BANK

BACKGROUND OF THE INVENTION

Embodiments relate to air handling units and, more particularly, to methods and systems for air filtering and sound attenuating in an air handling unit.

Air-handling systems (also referred to as an "air handler") have traditionally been used to condition buildings or rooms (hereinafter referred to as "structures"). The air-handling system may contain components such as cooling coils, heating coils, filters, humidifiers, fans, sound attenuators, controls, and other devices functioning to at least meet a specified air capacity which may represent all or only a portion of a total air handling requirement of the structure. The air-handling system may be manufactured in a factory and brought to the structure to be installed or it may be built on site using the appropriate devices to meet the specified air capacity. The air-handling compartment of the air-handling system includes one or more fan inlet cones, fan units and a discharge plenum. The fan units include an inlet cone, a fan, a motor, fan frame, and any appurtenance associated with the function of the fan (e.g. dampers, controls, settling means, and associated cabinetry).

In certain applications, filter banks and sound attenuator banks are positioned upstream from the fan. The filter bank is generally spaced apart from the sound attenuator so that maintenance can be performed from within the air handler. The space between the filter bank and sound attenuator increases the size of the air handler and may cause an unwanted pressure drop therein.

There remains a need for a more compact filter bank and sound attenuator configuration that reduces the pressure drop within the air handler.

SUMMARY OF THE INVENTION

In one embodiment, a filter bank is provided. The filter bank includes a housing having a front face and a back face. Air flows along an air flow path from the front face to the back face. A filter layer is held in the housing. The filter layer is oriented between the front and back faces such that air flows through the filter layer before discharging from the back face. An attenuation layer is positioned within the housing to attenuate sound as the sound propagates between the front and back faces. The attenuation layer is oriented to extend along the air flow direction.

In another embodiment, an air handling unit is provided. The air handling unit includes a fan for drawing an air flow path through the air handling unit. A filter bank is provided for filtering the air flow path. The filter bank includes a housing having a front face and a back face. Air flows along the air flow path from the front face to the back face. A filter layer is held in the housing. The filter layer is oriented between the front and back faces such that air flows through the filter layer before discharging from the back face. An attenuation layer is positioned within the housing to attenuate sound as the sound propagates between the front and back faces. The attenuation layer is oriented to extend along the air flow direction.

In a further embodiment, a method of filtering and attenuating sound within an air handling unit is provided. The method includes positioning a housing having a front face and a back face within the air handling unit. Air flows along an air flow path from the front face to the back face. A filter layer is coupled within the housing. The filter layer is oriented between the front and back faces such that air flows through the filter layer before discharging from the back face. An attenuation layer is positioned within the housing to attenuate sound as the sound propagates between the front and back faces. The attenuation layer is oriented to extend along the air flow direction.

BRIEF DESCRIPTION OF THE DRAWINGS

FIG. 25 is a perspective view of a damper formed in accordance with an embodiment.

FIG. 26 is a cross-sectional view of a combined attenuating and filtering layer formed in accordance with an embodiment.

FIG. 27 is a cross-sectional view of another combined attenuating and filtering layer formed in accordance with an embodiment.

FIG. 29 is a side view of an insulation board with open cell foam facings in accordance with an embodiment, the fiberglass therein is enclosed in between the facings.

FIG. 30 is a side view of sound being absorbed within an insulation board with an open cell foam facing in accordance with an embodiment.

FIG. 31 is an enlarged side view of protruding open cell foam facing formed between the openings in the perforated rigid facing and sound waves being absorbed by the protruding open cell foam facing.

DETAILED DESCRIPTION OF THE DRAWINGS

Figure 1:
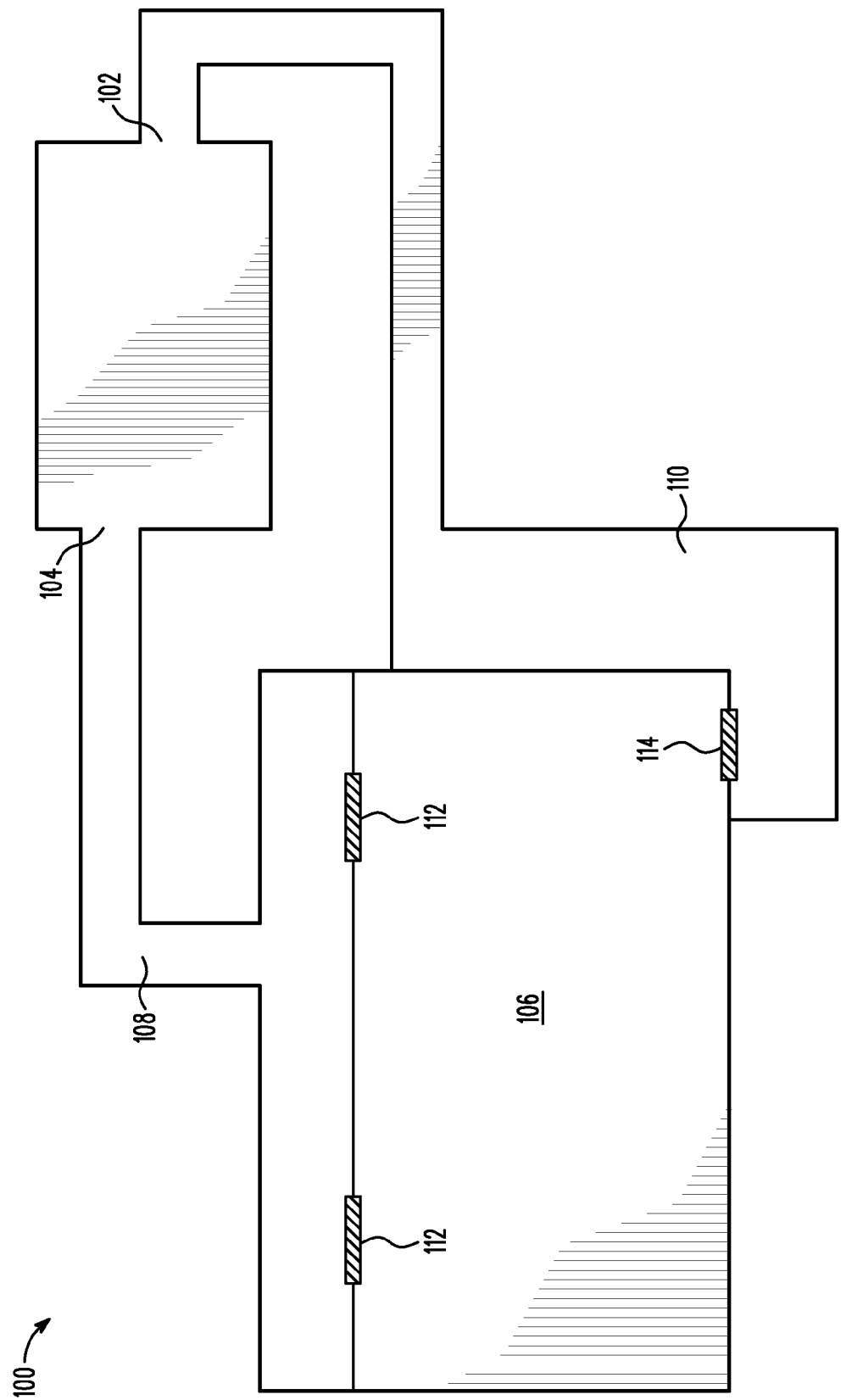
FIG. 1 is a schematic view of an air handling unit in accordance with an embodiment.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

FIG. 1 illustrates an air handling unit 100. The air handling unit 100 includes an air processing system 200 having an inlet 102 and an outlet 104. The air handling unit 100 is configured to condition air flowing through a room 106. The room 106 includes an inlet plenum 108 and an outlet plenum 110. The inlet plenum 108 extends between the room 106 and the outlet 104 of the air handling unit 100. The outlet plenum 110 extends from the room 106 to the inlet 102 of the air handling unit 100. Vents 112 are positioned at the junction of the inlet plenum 108 and the room 106. A return vent 114 is positioned at the junction of the outlet plenum 110 and the room 106. Optionally, filters may be positioned at each junction. The inlet plenum 108 and the outlet plenum 110 may include dampers and/or filter banks positioned therein.

During operation, air flows from the air handling unit 100 through the inlet plenum 108. The air is discharged from the vent 112 into the room 106 and circulates there through. During circulation throughout the room 106, at least some of the air is channeled through the return vent 114. The air flows through the outlet plenum 110 and returns to the air handling unit 100 through inlet 102. The air is reconditioned in the air handling unit 100 and recirculated to the room 106 through inlet plenum 108.

Figure 2:
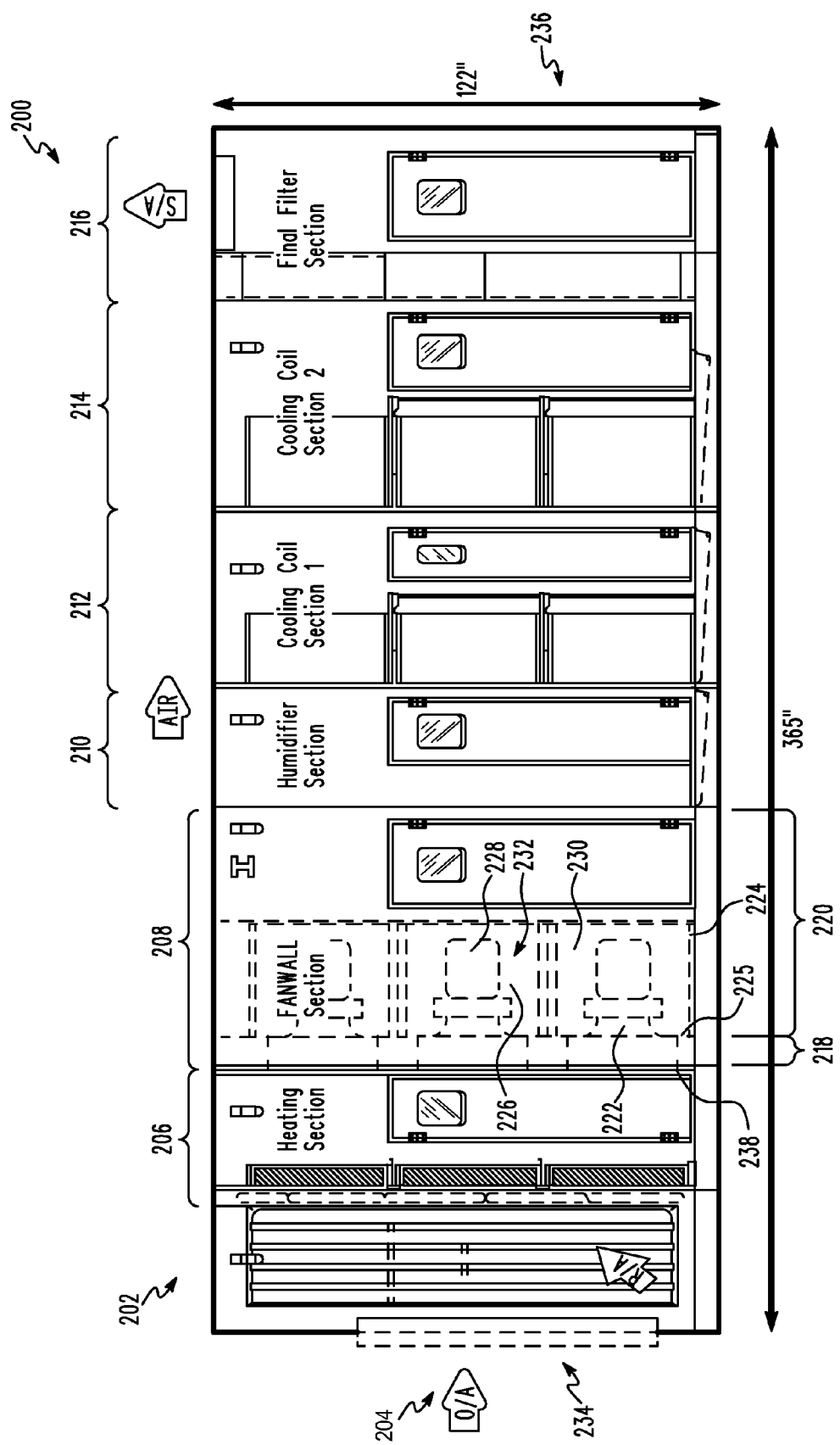
FIG. 2 is an air processing system that may be used with the air handling unit shown in FIG. 1.

FIG. 2 illustrates an air processing system 200 that utilizes a fan array air handling system in accordance with an embodiment. The system 200 includes an inlet 202 that receives air. A heating section 206 that heats the air is included and followed by an air handling section 208. A humidifier section 210 is located downstream of the air handling section 208. The humidifier section 210 adds and/or removes moisture from the air. Cooling coil sections 212 and 214 are located downstream of the humidifier section 210 to cool the air. A filter section 216 is located downstream of the cooling coil section 214 to filter the air. The sections may be reordered or removed. Additional sections may be included.

The air handling section 208 includes an inlet plenum 218 and a discharge plenum 220 that are separated from one another by a bulkhead wall 225 which forms part of a frame 224. Fan inlet cones 222 are located proximate to the bulkhead 225 of the frame 224 of the air handling section 208. The fan inlet cones 222 may be mounted to the bulkhead wall 225. Alternatively, the frame 224 may support the fan inlet cones 222 in a suspended location proximate to, or separated from, the bulkhead wall 225. Fans 226 are mounted to drive shafts on individual corresponding motors 228. The motors are mounted on mounting blocks to the frame 224. Each fan 226 and the corresponding motor 228 form one of the individual fan units 232 that may be held in separate chambers 230. The chambers 230 are shown vertically stacked upon one another in a column. Optionally, more or fewer chambers 230 may be provided in each column. One or more columns of chambers 230 may be provided adjacent one another in a single air handling section 208.

Figure 3:
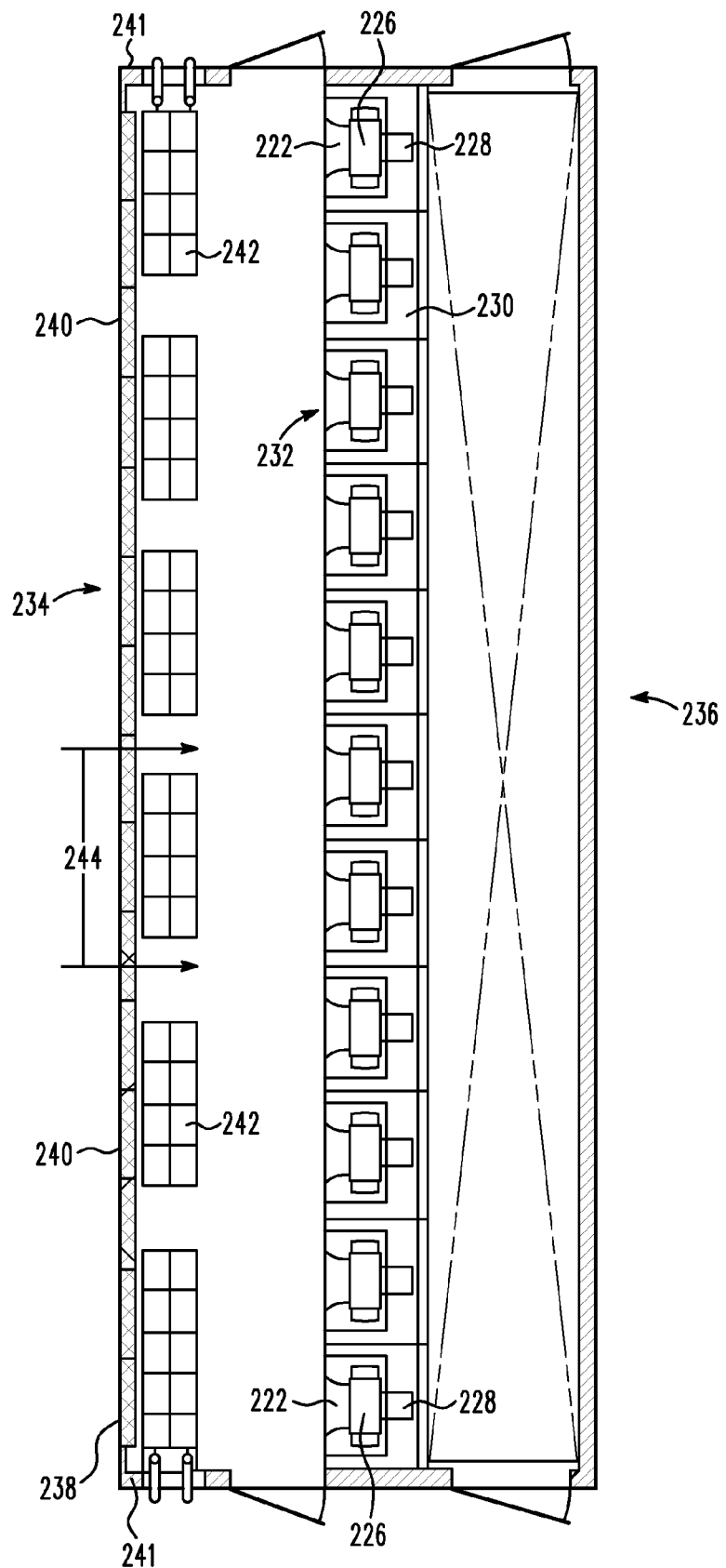
FIG. 3 is a top view of the fan wall section shown in FIG. 2.

FIG. 3 illustrates a top view of the air handling section 208 shown in FIG. 1. The air handling section 208 includes an upstream end 234 and a downstream end 236. Fans 226 are positioned between the inlet plenum 218 and the discharge plenum 220. The inlet plenum 218 is upstream of the fans 226. The discharge plenum 220 is downstream of the fans 226. A filter bank 238 is positioned at the upstream end 234 of the air handling section 208. The filter bank 238 includes a plurality of filters 240 positioned adjacent one another in a row. The filters 240 extend within a filter bank housing 241. The filters are positioned to form an air tight interface between each filter 240. The filters 240 may be formed from foam, pleated paper, spun fiberglass, and/or any other suitable filtering medium. The filters 240 are configured to remove impurities from the air flowing through the air handling section 208.

A plurality of sound attenuation panels 242 are positioned downstream from the filters 240. The sound attenuation panels 242 are positioned in a row with channels 244 extending therebetween. The sound attenuation panels 242 may have a shape that exhibits a low pressure drop thereacross. Additionally, the sound attenuation panels 242 may be perforated or solid. Additional details regarding the sound attenuation panels 242 are described in more detail below with respect to FIGS. 28-34. In the exemplary embodiment, the sound attenuation panels 242 are arranged parallel to the filters 240. Optionally, and as described with respect to FIGS. 4-25, the filters 240 and sound attenuation panels 242 may be arranged in non-linear and/or non-parallel configurations.

FIGS. 4-25 illustrate various embodiments of filter banks 238 that may be used with the air handling section 208 or in another application. It should be appreciated that the filter banks 238 of the various embodiments may also be utilized with a ceiling unit or any other suitable heating, cooling, or ventilation system. The filter banks 238 may be positioned upstream or downstream from the fans 226. The filter banks include at least one filtering layer and at least one attenuating layer positioned proximate or immediately adjacent to the filtering layer. The filter banks 238 occupy a small space within the air handling section 208 and exhibit a low pressure drop thereacross. It should be noted that the filter banks 238 are illustrated in the air handling section 208. Optionally, the filter banks 238 may be positioned in the inlet plenum 108 and/or the outlet plenum 110 of the air handling unit 100.

Figure 4:
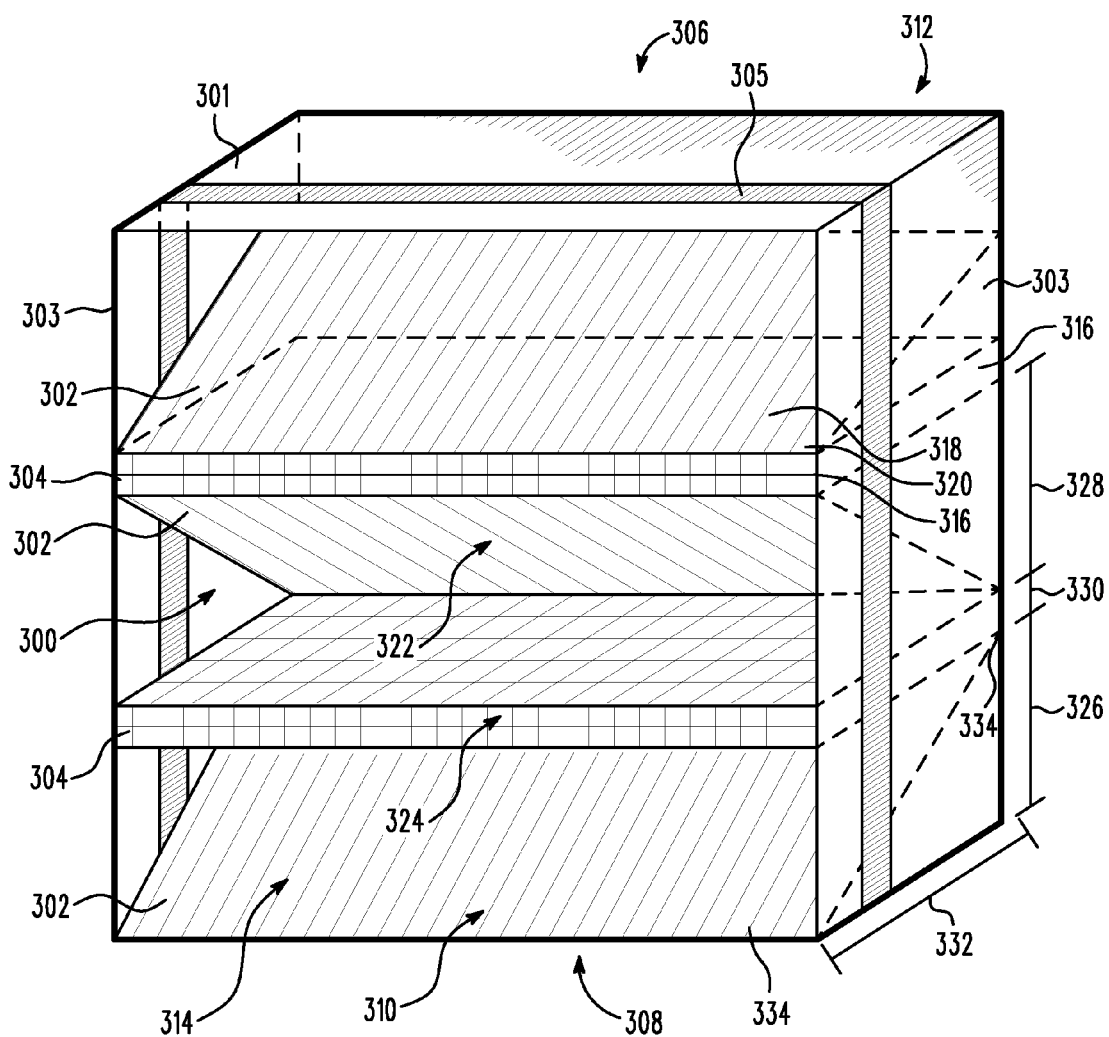
FIG. 4 is a perspective view of an embodiment of a filter/sound attenuation bank formed in accordance with an embodiment.

FIG. 4 is a perspective view of a filter/sound attenuation bank housing 301 having outer walls 303. The filter/sound attenuation bank housing 301 contains a filter/sound attenuation bank 300. Air flows in the direction 314 through the filter/sound attenuation bank 300. A coupling frame 305 extends along the outer walls 303. The filter/sound attenuation bank 300 is coupled to the housing 301. Optionally, the filter/sound attenuation bank 300 is coupled to the coupling frame 305. The filter/sound attenuation bank 300 includes a plurality of filtering layers 302 and a plurality of attenuating layers 304. The filtering layers 302 and the attenuating layers 304 may be coupled to the coupling frame 305 and/or the housing 301. The filtering layers 302 extend between adjacent attenuating layers 304. The filter/sound attenuation bank 300 includes a top end 306 and a bottom end 308. In the exemplary embodiment, the top end 306 and the bottom end 308 include a filtering layer 302 that extends between an attenuating layer 304 and the housing 301. Optionally, an attenuating layer 304 may be coupled directly to the housing 301. The filter/sound attenuation bank 300 is coupled to the housing 301 and/or coupling frame 305 to form an air tight interface. The filtering layers 302 and the attenuating layers 304 are coupled together to form an air tight interface. Airflow is directed through the filtering layers 302 of the filter/sound attenuation bank 300. Optionally, the attenuating layers 304 may represent interior walls that are semi-permeable and allow airflow therethrough.

Figure 5:
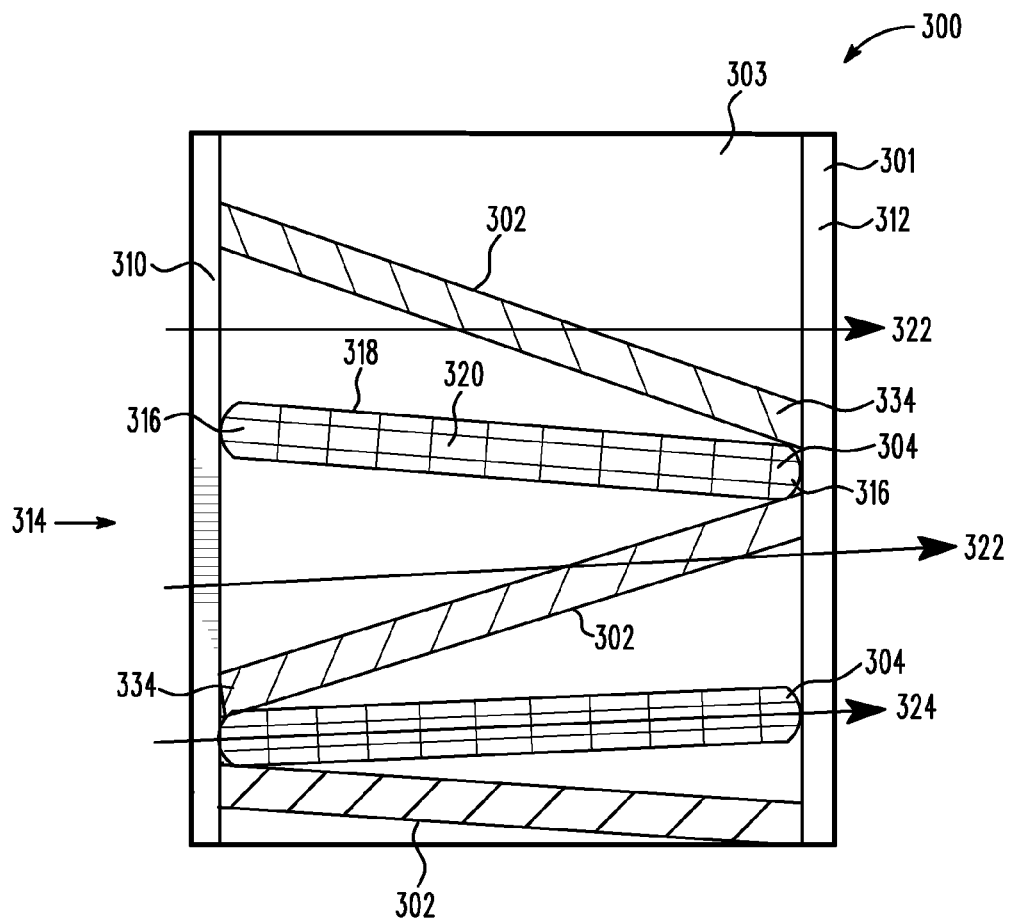
FIG. 5 is a side view of a filter/sound attenuation bank formed in accordance with an embodiment.

FIG. 5 is a side view of an embodiment of the filter/sound attenuation bank 300. The housing 301 includes planar front and back faces 310 and 312. The front and back faces 310 and 312 are perforated to allow air to flow therethrough in the direction of arrows 314. The attenuation layers 304 are spaced apart from the outer walls 303. The attenuation layers 304 are oriented to extend between the front and back faces 310 and 312. Optionally, the attenuation layers 304 may only extend partially from or to either or both of the front and back faces 310 and 312. The filtering layers 302 and the attenuating layers 304 are stacked in an interlaced manner transverse to the direction of air flow 314. The attenuating layers 304 may be arranged parallel to each other and substantially parallel to the direction of air flow 314. Optionally, the attenuating layers 304 may be positioned at a common or different acute angles to one another and an acute angle to the air flow 314.

Each attenuating layer 304 includes opposed ends 316, planar site faces 318 and a middle portion 320 extending therebetween. The ends 316 of each attenuating layer 304 may be rounded or convex. Optionally, the ends 316 of the attenuating layers 304 may be flat, pointed, concave, and/or non-uniformly rounded. Air channels 322 are formed by adjacent attenuating layers toward the front and back faces 310 and 312. The filter layer 302 is oriented to traverse for air flow through the filter/sound attenuation bank 300. The air channels 322 are also located between the attenuation layers 304 and outer walls 303 of the housing 301. The attenuation layers 304 may represent interior walls that are semi-permeable and form an inner air channel 324 and outer air channels 322. Air flows through the air channels 322, 324 in the direction of 314. The air channels 322 and 324 have widths 326, 328 and 330, that may be equal to one another or differ in width. The air channels 322, 324 have a common length 332 between parallel planar front and back faces 310 and 312. Optionally, the front and/or back faces 310 and 312 may be contoured to be non-planar such that the length 332 may be different within an individual channel 322, 324 or between different channels 322, 324.

Each filter layer 302 extends toward the front and back faces 310 and 312. The filter layer 302 is oriented to traverse diagonally from an end 316 of a first attenuating layer 304 to an end 316 of an adjacent attenuating layer 304. Optionally, the ends 334 of the filter layers 302 may extend to or from middle portions 320 of the attenuating layers 304. The ends 334 may engage and adjoin an end 316 of a first attenuating layer 304 and a middle portion 320 of an adjacent attenuating layer 304. The ends 334 of the filter layers 302 abut and form an air tight interface with the ends 316 or middle portions 320 of the attenuating layers 304.

Figure 6:
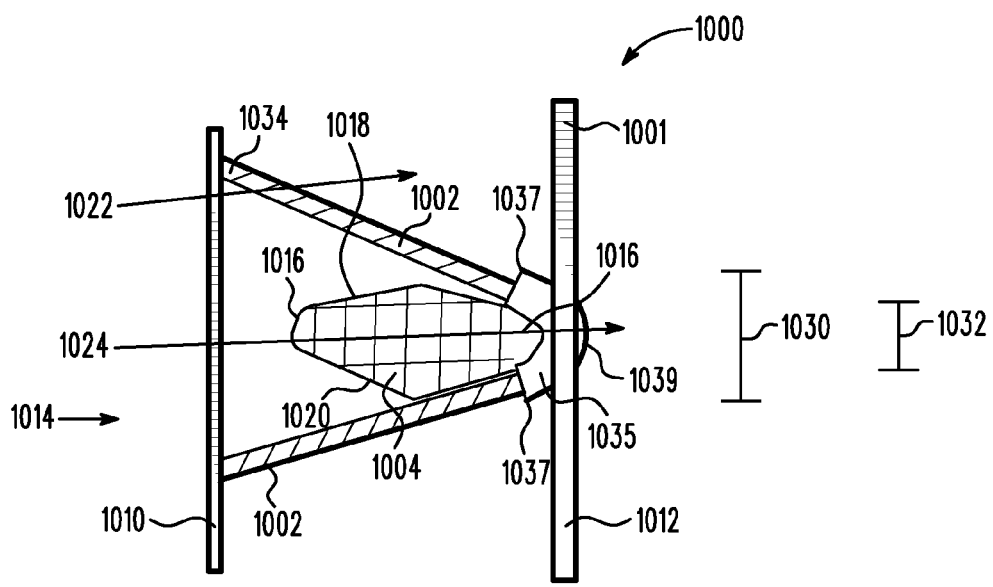
FIG. 6 is a side view of a filter/sound attenuation bank formed in accordance with an embodiment.

FIG. 6 is a side view of a filter/sound attenuation bank 1000. The attenuation layers 1004 extend at least partially from or to either or both of the front and back faces 1010 and 1012. The filtering layers 1002 and the attenuating layers 1004 are stacked in an interlaced manner transverse to the direction of air flow 1014. The attenuating layers 1004 may be arranged in parallel or at a common or different angle to one another.

Each attenuating layer 1004 includes opposed ends 1016, planar site faces 1018 and a middle portion 1020 extending therebetween. The ends 1016 of each attenuating layer 1004 may be rounded, flat, pointed, convex, concave, and/or non-uniformly rounded. The middle portion 1020 has a width 1030 that is greater than a width 1032 of the ends 1016. Air channels 1022 are formed by adjacent attenuating layers between the front and back faces 1010 and 1012. The air channels 1022 are also located between the attenuation layers 1004 and outer walls 1003 of the housing 1001. Optionally, the attenuation layers 1004 may represent interior walls that are semi-permeable and form an inner air channel 1024 and outer air channels 1022.

Each filter layer 1002 extends toward the front and back faces 1010 and 1012. The filter layer 1002 is oriented to traverse diagonally from an end 1016 of a first attenuating layer 1004 to an end 1016 of an adjacent attenuating layer 1004. Optionally, the ends 1034 of the filter layers 1002 may extend to or from middle portions 1020 of the attenuating layers 1004. The ends 1034 engage a coupling mechanism 1035 that couples the filtering layers 1002 to the attenuating layers 1004. The coupling mechanism 1035 includes outer clamps 1037 and an inner clamp 1039. The ends 1034 of the filtering layers 1002 engage one of the outer clamps 1037 to form an airtight interface. The ends 1016 of the attenuating layer 1004 engage the inner clamp 1039 to form an airtight interface. Optionally, the coupling mechanism 1035 may adjoin an end 1016 of a first attenuating layer 1004 and a middle portion 1020 of an adjacent attenuating layer 1004 to form an airtight interface.

Figure 7:
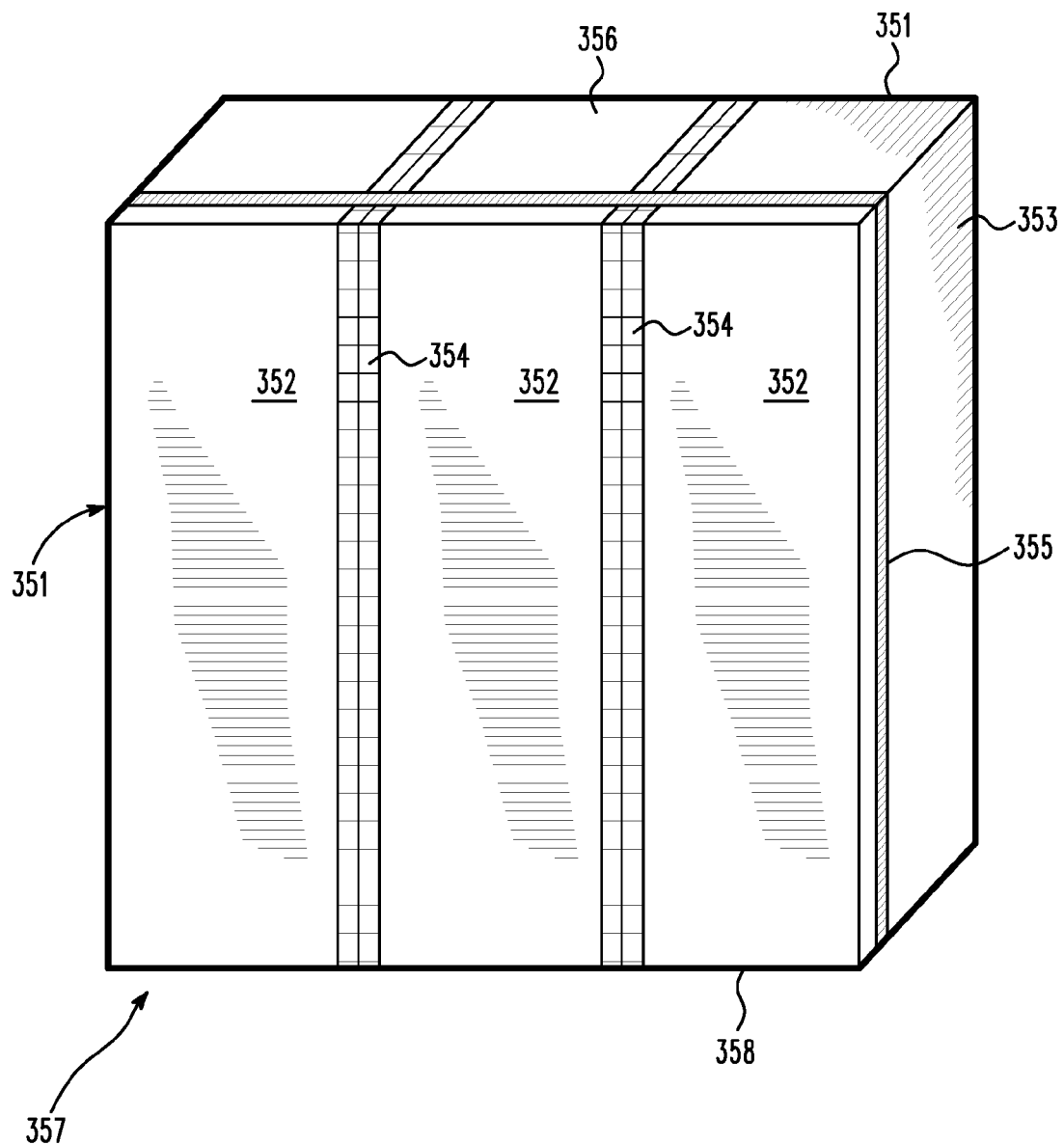
FIG. 7 is a perspective view of a filter/sound attenuation bank housing formed in accordance with an embodiment.

FIG. 7 is a perspective view of a filter/sound attenuation bank housing 351 having outer walls 353, a top wall 356, and a bottom wall 358. The filter/sound attenuation bank housing 351 contains a filter/sound attenuation bank 350. Air flows in the direction 357 through the filter/sound attenuation bank 350. A coupling frame 355 extends along the outer walls 353. The filter/sound attenuation bank 350 is coupled to the housing 351. Optionally, the filter/sound attenuation bank 350 is coupled to the coupling frame 355. The filter/sound attenuation bank 350 includes a plurality of filtering layers 352 and a plurality of attenuating layers 354. The filtering layers 352 extend between the top wall 356 and the bottom wall 358. The filtering layers 352 couple to the walls 356, 358 to form an airtight interface. Optionally, the filtering layers 352 couple to the coupling frame 355. The filtering layers 352 are arranged in a row along the same plane. Optionally, the filtering layers 352 are arranged in a non-planar row.

The attenuating layers 354 extend between adjacent filtering layers 352. The attenuating layers 354 may be coupled to the coupling frame 355 and/or the housing 351 to form an airtight interface. Optionally, the attenuating layers 354 may be coupled to the filtering layers 352 to form an airtight interface. The attenuating layers 354 extend substantially perpendicularly to the filtering layers 352. Optionally, the attenuating layers 354 may be arranged at a common or different angle from the filtering layers 352. Airflow is directed through the filtering layers 352 of the filter/sound attenuation bank 350. Optionally, the attenuating layers 354 may represent interior walls that are semi-permeable and allow airflow therethrough.

Figure 8:
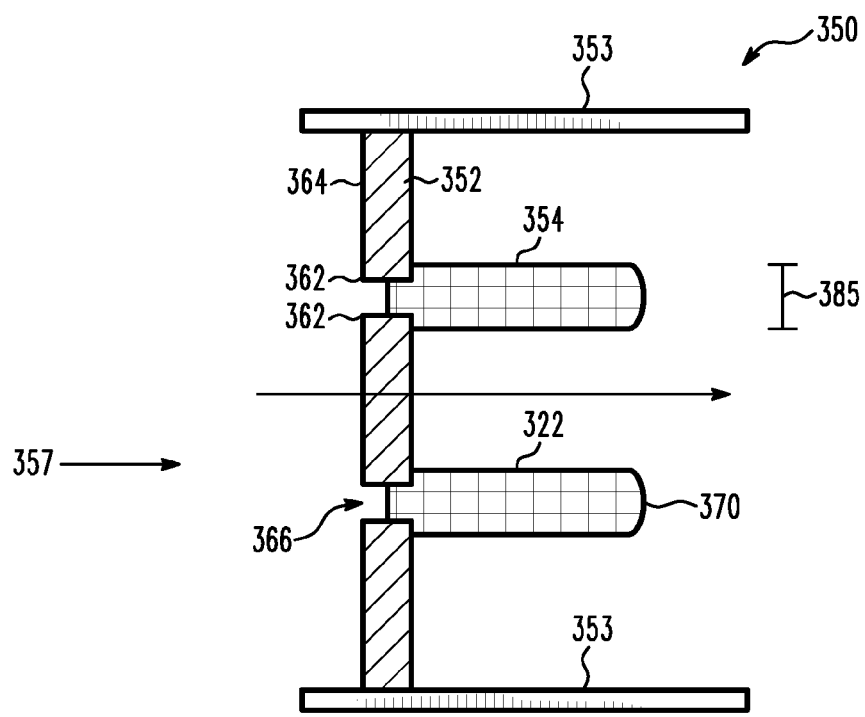
FIG. 8 is a top view of a filter/sound attenuation bank formed in accordance with an embodiment.

FIG. 8 illustrates a top view of the filter/sound attenuation bank 350. The filtering layers are 352 are arranged in the same plane. Optionally, the filtering layers 352 are arranged at angles with respect to one another. Additionally, the filtering layers 352 may be arranged in a concave, convex, and/or curved configuration. The filtering layers 352 are arranged so that the ends 362 are positioned adjacent and/or abut one another at the junction 366. Filter/sound attenuation bank 350 includes at least one row of filtering layers 352 arranged in parallel and/or at angles to one another.

The attenuating layers 354 are positioned parallel to one another. Optionally, the attenuating layers 354 may be positioned at angles to one another. The attenuating layers 354 extend substantially perpendicular and/or at an angle with respect to the filtering layers 352. Each attenuating layer 354 abuts the junction 366 of the filter layer ends 362 and/or the planar face 364 of a filter layer 352. The middle portion 372 of each attenuating layer 354 extends in a plane between the ends 370 so that the attenuating layer 354 has a uniform width 385. The ends 370 may be rounded, flat, pointed, convex, concave, and/or non-uniformly rounded. Airflow is directed through the filtering layers 352 and around the attenuating layers 354. Optionally, the attenuating layers 354 may represent interior walls that are semi-permeable and allow airflow therethrough.

Figure 9:
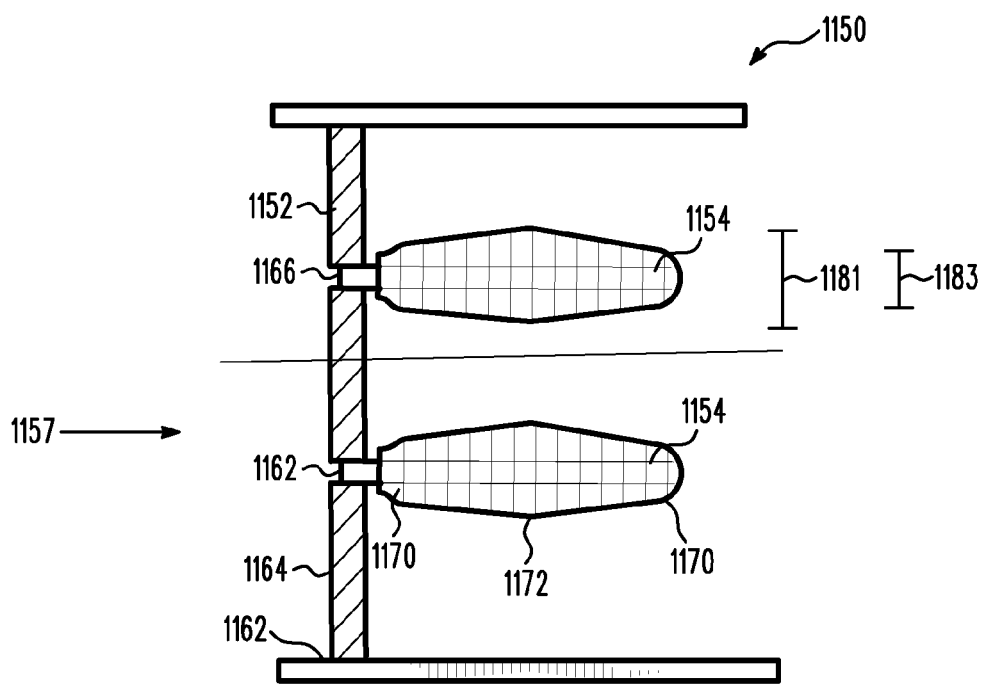
FIG. 9 is a top view of a filter/sound attenuation bank formed in accordance with an embodiment.

FIG. 9 illustrates a top view of a filter/sound attenuation bank 1150. Air flows in a direction 1157 through the filter/sound attenuation bank 1150. Each filtering layer 1152 has a pair of ends 1162 and planar faces 1164 extending therebetween. The filtering layers are 1152 are arranged in the same plane. Optionally, the filtering layers 1152 are arranged at angles with respect to one another. Additionally, the filtering layers 1152 may be arranged in a concave, convex, and/or curved configuration. The filtering layers 1152 are arranged so that the ends 1162 are positioned adjacent one another. Optionally, the filtering layers 1152 are arranged so that the ends 1162 abut each other at a junction 1166 to form an airtight interface. FIG. 9 illustrates a single row of filtering layers 1152. Optionally, filter/sound attenuation bank 1150 may include multiple rows of filtering layers 1152 arranged in parallel and/or at angles to one another.

The attenuating layers 1154 are positioned parallel to one another. Optionally, the attenuating layers 1154 may be positioned at angles to one another. The attenuating layers 1154 extend substantially perpendicular to the filtering layers 1152. Optionally, the attenuating layers 1154 may extend at angles with respect to the filtering layers 1152. Each attenuating layer 1154 abuts a junction 1166 of the filter layer ends 1162 to form an airtight interface. Optionally, the attenuating layers 1154 may abut the planar face 1164 of a filter layer 1152. The attenuating layers 1154 may also be coupled to the junction 1166 and/or planar face 1164 utilizing a coupling device.

Each attenuating layer 1154 includes a pair of ends 1170 and a middle portion 1172 extending therebetween. In the exemplary embodiment, the middle portion 1172 has a width 1181 that is greater than the width 1183 of the ends 1170. The ends 1170 may be rounded, flat, pointed, convex, concave, and/or non-uniformly rounded. Airflow is directed through the filtering layers 1152 and around the attenuating layers 1154. Optionally, the attenuating layers 1154 may represent interior walls that are semi-permeable and allow airflow therethrough.

Figure 10:
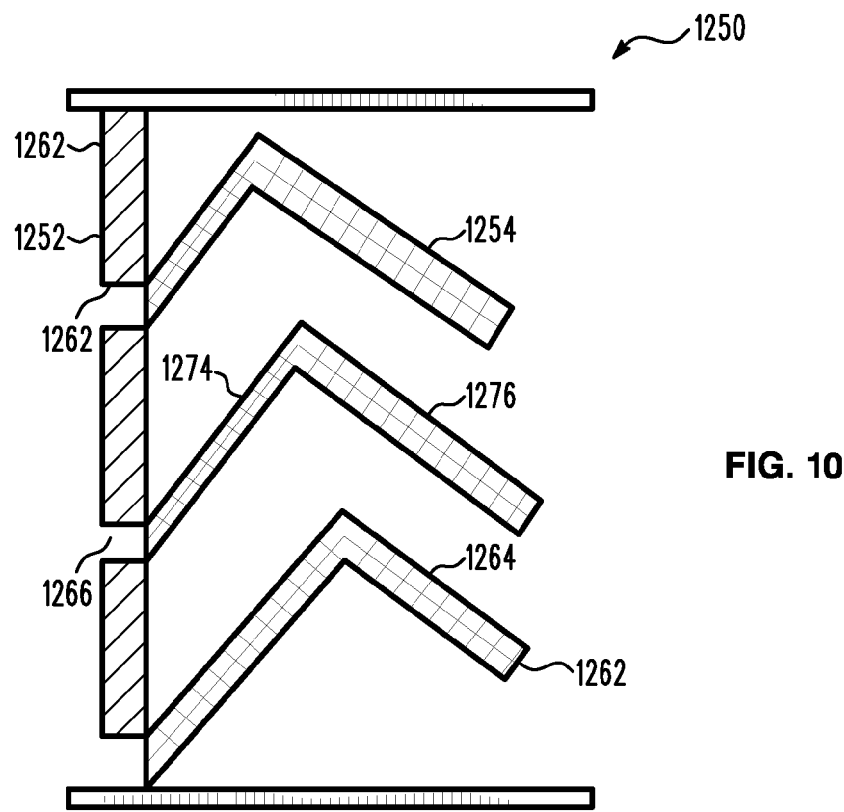
FIG. 10 is a top view of a filter/sound attenuation bank formed in accordance with an embodiment.

FIG. 10 illustrates a top view of a filter/sound attenuation bank 1250. The filtering layers are 1252 are arranged in the same plane. Optionally, the filtering layers 1252 are arranged at angles with respect to one another. Additionally, the filtering layers 1252 may be arranged in a concave, convex, and/or curved configuration. The filtering layers 1252 are arranged so that the ends 1262 are positioned adjacent and/or abut one another at the junction 1266. Filter/sound attenuation bank 1250 includes at least one row of filtering layers 1252 arranged in parallel and/or at angles to one another.

The attenuating layers 1254 extend at an angle from the filtering layers 1252. Each attenuating layer 1254 includes a first attenuating member 1274 and a second attenuating member 1276. The first attenuating member 1274 abuts the junction 1266 of the filter layer ends 1262 and/or the planar face 1264 of a filter layer 1252. The second attenuating member 1276 extends at an angle from the second attenuating member 1276. The attenuating members 1274, 1276 are angled so as to eliminate a line of sight between adjacent attenuating layers 1254. The angle between the attenuating members 1274, 1276 may be the same for each attenuating layer 1254. Optionally, the angle of each attenuating layer 1254 may vary. Optionally, the filter/sound attenuation bank 1250 may include at least one attenuating layer 1254 that extends perpendicular to the filtering layers 1252. The attenuating layers 1254 may have a uniform width and/or widths that vary along the length of the middle portion 1272. The ends 1270 may be rounded, flat, pointed, convex, concave, and/or non-uniformly rounded. Airflow is directed through the filtering layers 1252 and around the attenuating layers 1254. Optionally, the attenuating layers 1254 may represent interior walls that are semi-permeable and allow airflow therethrough.

Figure 11:
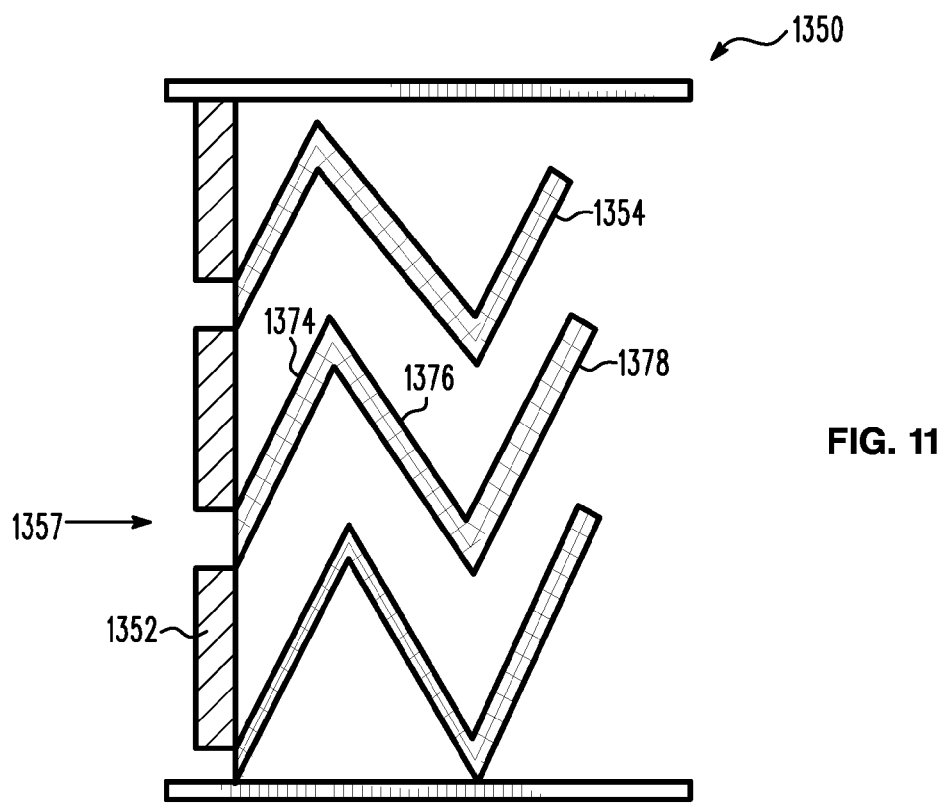
FIG. 11 is a top view of a filter/sound attenuation bank formed in accordance with an embodiment.

FIG. 11 is a top view of a filter/sound attenuation bank 1350. The attenuating member 1354 has a third attenuating member 1378 extending at angle from the second attenuating member 1376. The attenuating members 1374, 1376, and 1378 are angled so as to eliminate a line of sight between the attenuating layers 1354. Airflow 1357 is directed through the filtering layers 1352 and around the attenuating layers 1354. Optionally, the attenuating layers 1354 may represent interior walls that are semi-permeable and allow airflow therethrough.

Figure 12:
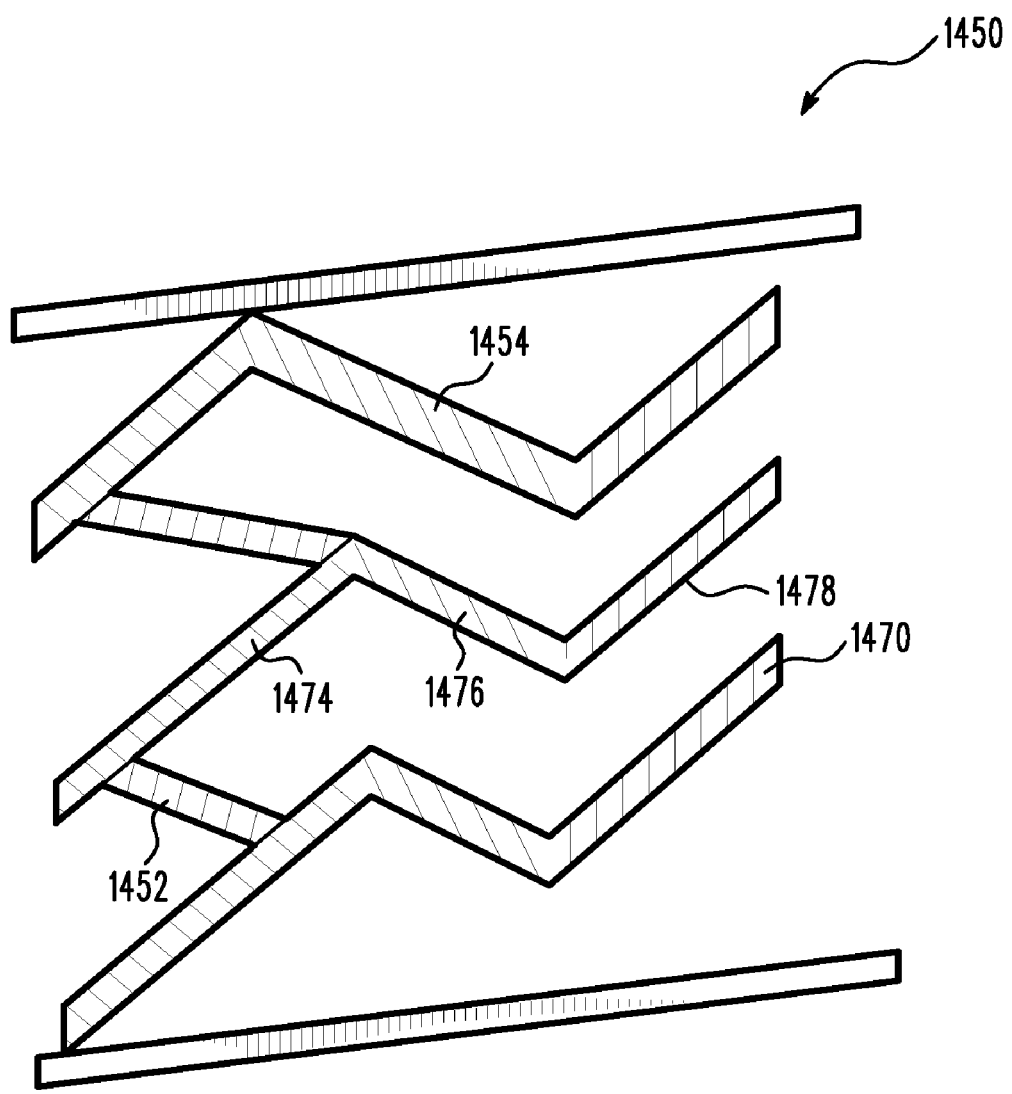
FIG. 12 is a top view of a filter/sound attenuation bank formed in accordance with an embodiment.

FIG. 12 is a top view of a filter/sound attenuation bank 1450. The attenuation layers 1454 include attenuating members 1474, 1476, and 1478. The attenuating members 1474, 1476, and 1478 are angled to eliminate a line of sight therebetween. The attenuating members 1454 may include ends 1470 that are rounded, flat, pointed, convex, concave, and/or non-uniformly rounded. The filtering layers 1452 extend between adjacent attenuating layers 1454. The filtering layers 1452 may extend at an angle between the attenuating layers 1454. Optionally, the filtering layers 1452 extend perpendicular to each attenuating layer 1454. The attenuating layers 1454 and the filtering layers 1452 are coupled together to form an airtight interface. FIG. 12 illustrates a single filtering layer 1452 extending between each adjacent attenuating layer 1454. Optionally, multiple filtering layers 1452 may extend between each attenuating layer 1454. Airflow is directed through the filtering layers 1452 and around the attenuating layers 1454. Optionally, the attenuating layers 1454 may represent interior walls that are semi-permeable and allow airflow therethrough.

In another embodiment, a filter bank may have any combination of the filtering layers and attenuating layers shown in FIGS. 8-12.

Figure 13:
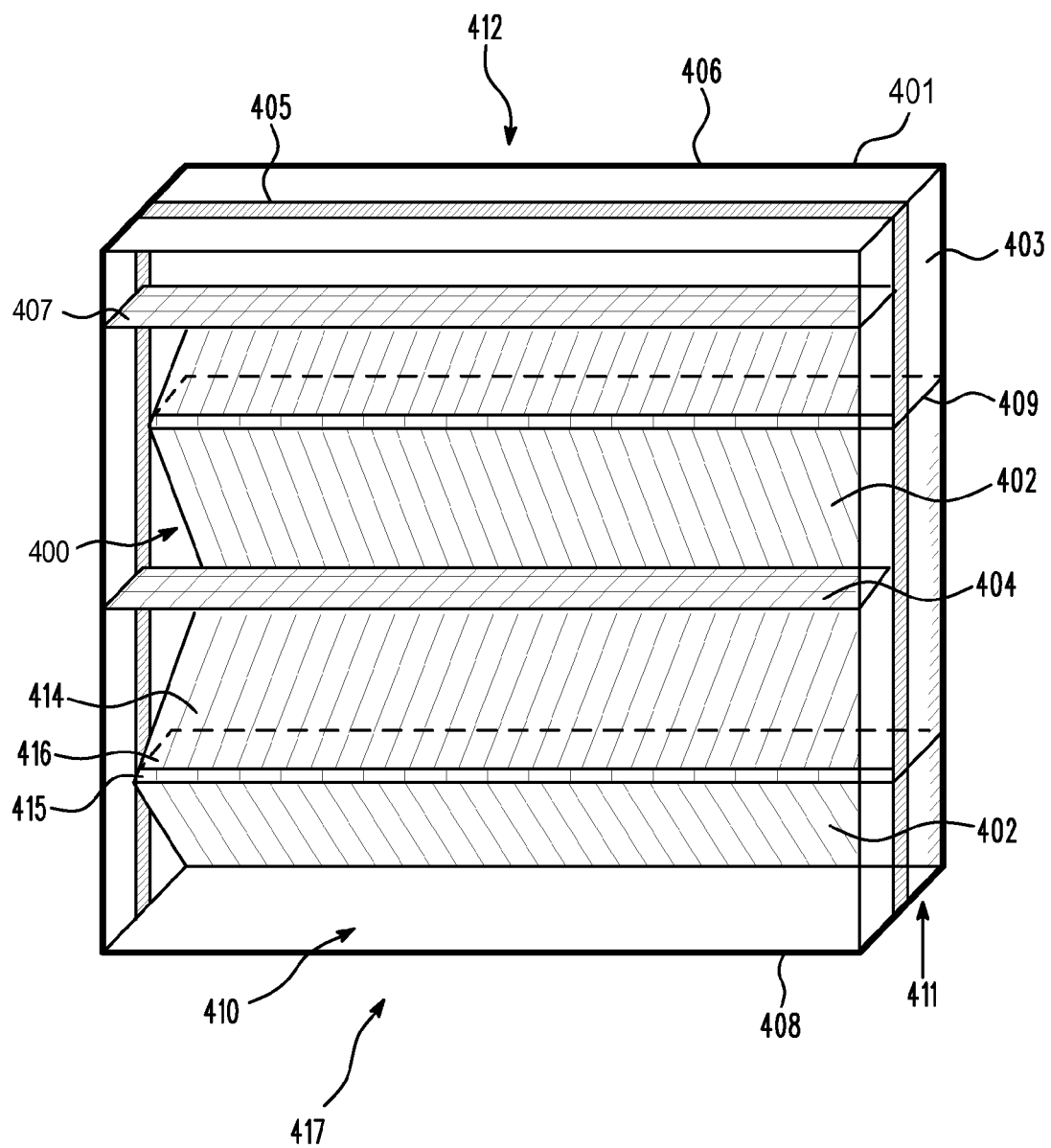
FIG. 13 is a perspective view of a filter/sound attenuation bank housing formed in accordance with an embodiment.

FIG. 13 is a perspective view of a filter/sound attenuation bank housing 401 having outer walls 403 and planar front and back faces 410 and 412. The front and back faces 410 and 412 are perforated to allow air to flow therethrough in the direction of arrows 414. The filter/sound attenuation bank housing 401 contains a filter/sound attenuation bank 400. Air flows in the direction 414 through the filter/sound attenuation bank 400. A coupling frame 405 extends along the outer walls 403. The filter/sound attenuation bank 400 is coupled to the housing 401. Optionally, the filter/sound attenuation bank 400 is coupled to the coupling frame 405. The filter/sound attenuation bank 400 includes a plurality of filtering layers 402 and a plurality of attenuating layers 304. The filtering layers 402 and the attenuating layers 404 may be coupled to the coupling frame 405 and/or the housing 401.

The attenuating layers 404 include a front plurality of attenuating layers 407 and a back plurality of attenuating layers 409. Each attenuating layer 404 includes a front end 415, a back end 414, and a middle 416 extending between the ends 415, 414. The front plurality of attenuating layers 407 extend along the front face 410. The front plurality of attenuating layers 407 are positioned substantially parallel to one another. Optionally, the front plurality of attenuating layers 407 are angled with respect to one another. The front plurality of attenuating layers 407 extend from the front face 410 to approximately a center 411 of the filter bank housing 401. Optionally, the front plurality of attenuating layers 407 extend short of or beyond the center 411. The back plurality of attenuating layers 409 extend along the back face 412. The back plurality of attenuating layers 409 are positioned substantially parallel to one another. Optionally, the back plurality of attenuating layers 409 are angled with respect to one another. The back plurality of attenuating layers 409 extend from the back face 412 to approximately the center 411 of the filter bank housing 401. Optionally, the back plurality of attenuating layers 409 extend short of or beyond the center 411.

The filtering layers 402 extend between the front plurality of attenuating layers 407 and the back plurality of attenuating layers 409. Each filtering layer 402 extends from a front end 415 of a back attenuating layer 409 and a back end 414 of a front attenuating layer 407. The filter/sound attenuation bank 400 includes a top end 406 and a bottom end 408. In the exemplary embodiment, the top end 406 and the bottom end 408 include a filtering layer 402 that extends between an attenuating layer 404 and the housing 401. Optionally, an attenuating layer 404 may be coupled directly to the housing 401. The filter/sound attenuation bank 400 is coupled to the housing 401 and/or coupling frame 405 to form an air tight interface. The filtering layers 402 and the attenuating layers 404 are coupled together to form an air tight interface. Airflow is directed through the filtering layers 402 of the filter/sound attenuation bank 400. Optionally, the attenuating layers 404 may represent interior walls that are semi-permeable and allow airflow therethrough.

Figure 14:
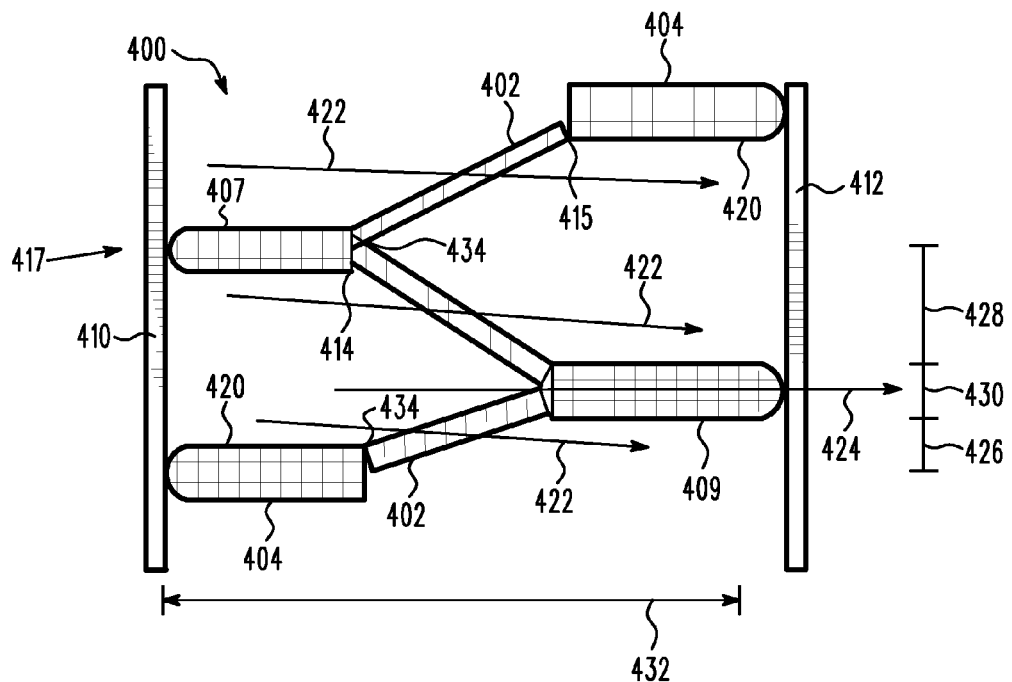
FIG. 14 is a side view of a filter/sound attenuation bank formed in accordance with an embodiment.

FIG. 14 is a side view of an embodiment of the filter/sound attenuation bank 400. The attenuation layers 404 extend between the outer walls 403. The attenuation layers 404 are oriented to extend from one of the front face 410 and the back face 412. The front plurality of attenuating layers 407 extend at least partially from the front face 410 to the back face 412. The back plurality of attenuating layers 409 extend at least partially from the back face 412 to the front face 410. The filtering layers 402 and the attenuating layers 404 are stacked in an interlaced manner transverse to the direction of air flow 417. The attenuating layers 404 may be arranged parallel to each other and substantially parallel to the direction of air flow 417. Optionally, the attenuating layers 404 may be positioned at a common or different acute angles to one another and an acute angle to the air flow 417.

The attenuating layer ends 415, 414 may be rounded, flat, pointed, concave, convex, and/or non-uniformly rounded. Air channels 422 are formed by adjacent attenuating layers toward the front and back faces 410 and 412. The filtering layer 402 is oriented traverse to air flow through the filter/sound attenuation bank 400. The air channels 422 are also located between the attenuation layers 404 and outer walls 403 of the housing 401. The attenuation layers 404 may represent interior walls that are semi-permeable and form an inner air channel 424 and outer air channels 422. Air flows through the air channels 422, 424 in the direction of 417. The air channels 422 and 424 have widths 426, 428 and 430, that may be equal to one another or differ in width. The air channels 422, 424 have a common length 432 between parallel planar front and back faces 410 and 412. Optionally, the front and/or back faces 410 and 412 may be contoured to be non-planar such that the length 432 may be different within an individual channel 422, 424 or between different channels 422, 424.

The filtering layers 402 extend between the front plurality of attenuating layers 407 and the back plurality of attenuating layers 409. Each filtering layer 402 extends from a front end 415 of a back attenuating layer 409 and a back end 414 of a front attenuating layer 407. Optionally, the ends 434 of the filter layers 402 may extend to or from middle portions 420 of the attenuating layers 404. The ends 434 may engage and adjoin an end 415, 414 of an attenuating layer 404 and a middle portion 420 of an adjacent attenuating layer 404. The ends 434 of the filter layers 402 abut and form an air tight interface with the ends 416 or middle portions 420 of the attenuating layers 404.

Figure 15:
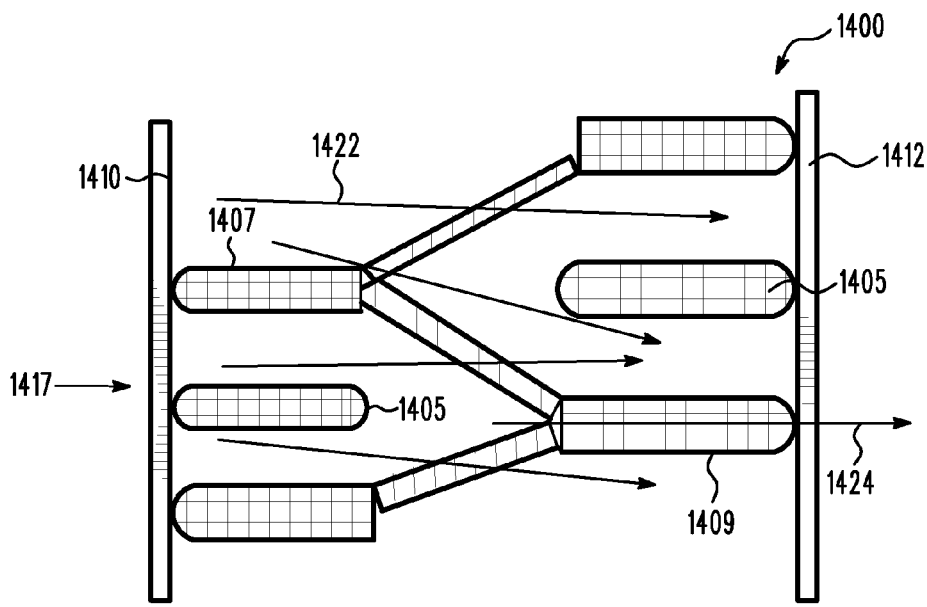
FIG. 15 is a side view of a filter/sound attenuation bank formed in accordance with an embodiment.

FIG. 15 is a side view of a filter/sound attenuation bank 1400. The front plurality of attenuating layers 1407 extend at least partially from the front face 1410 to the back face 1412. The back plurality of attenuating layers 1409 extend at least partially from the back face 1412 to the front face 1410. The filtering layers 1402 and the attenuating layers 1404 are stacked in an interlaced manner. An additional plurality of attenuating layers 1405 are arranged between adjacent front attenuating layers 1407 and between adjacent back attenuating layers 1409. The attenuating layers 1404 and 1405 may be arranged parallel to each other and substantially parallel to the direction of air flow 1417. Optionally, the attenuating layers 1404 and 1405 may be positioned at a common or different acute angles to one another and an acute angle to the air flow 1417. Air channels 1422 are formed by adjacent attenuating layers. The attenuation layers 1404 and 1405 may represent interior walls that are semi-permeable and form an inner air channel 1424 and outer air channels 1422. Air flows through the air channels 1422, 1424 in the direction of 1417.

The filtering layers 1402 extend between the front plurality of attenuating layers 1407 and the back plurality of attenuating layers 1409.

Figure 16:
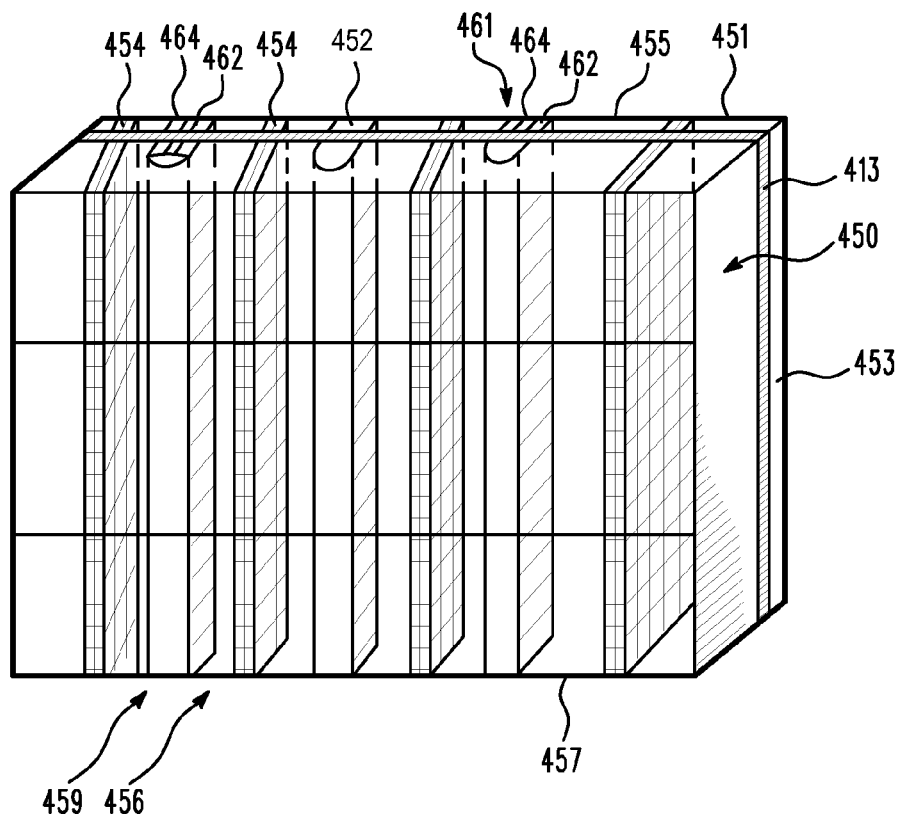
FIG. 16 is a perspective view of a filter/sound attenuation bank housing formed in accordance with an embodiment.

FIG. 16 illustrates a filter/sound attenuation bank housing 451 having a filter/sound attenuation bank 450. The housing 451 includes outer walls 453, a top 455, a bottom 457, a front face 459, and a back face 461. The front face 459 and at least a portion of the back face 461 are perforated to allow air to flow therethrough in the direction of arrows 456. Optionally, a coupling frame 405 extends along the outer walls 453 and the top 455. The filter/sound attenuation bank 450 includes attenuating layers 454 and filtering layers 452. The attenuating layers 454 and filtering layers 452 are coupled to the housing 451 and/or the coupling frame 405 to form an airtight interface.

Attenuating layers 454 extend between the front face 459 and the back face 461. The attenuating layers 454 are arranged perpendicular to each of the front face 459 and the back face 461. Optionally, the attenuating layers 454 may extend at an acute angle with respect to the front and back faces 459, 461. The attenuating layers 454 are positioned in parallel. Optionally, the attenuating layers 454 may be acutely angled with respect to each other. Airflow is directed around attenuating layers 454 and through the filtering layers 452 of the filter/sound attenuation bank 450. Optionally, the attenuating layers 454 may represent interior walls that are semi-permeable and allow airflow therethrough.

Filtering layers 452 extend at least partially from the back face 461. The filtering layers 452 extend substantially perpendicular to the front and back faces 459, 461. Optionally, the filtering layers 452 may extend at an acute angle to front and back faces 459, 461. The filtering layers 452 are arranged parallel to one another. Optionally, the filtering layers 452 may be arranged at an angle to one another. A pair of filtering layers 452 is positioned within a pair of adjacent attenuating layers 454. Optionally, any number of filtering layers 452 may be positioned between adjacent attenuating layers 454. The filtering layers 452 form an inner channel 462 through a perforated portion 464 of the back face 461.

Figure 17:
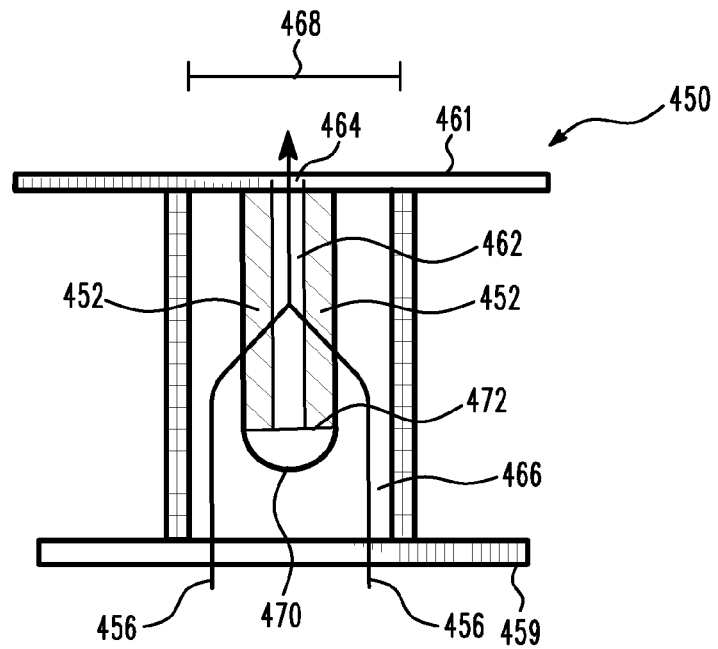
FIG. 17 is a top view of a filter/sound attenuation bank formed in accordance with an embodiment.

FIG. 17 illustrates a top view of the filter/sound attenuation bank 450. Adjacent attenuating layers 454 form an outer channel 466. The outer channel 466 has a width 468. In the exemplary embodiment, the attenuating layers 454 form a plurality of outer channels 466 each having the same width 468. Optionally, channels 466 may have varying widths 468. The outer channel 466 has a uniform width 468. Optionally, the width 468 of the outer channel 466 may vary. The attenuating layers 454 are arranged perpendicular to each of the front face 459 and the back face 461. Optionally, the attenuating layers 454 may extend at an acute angle with respect to the front and back faces 459, 461. The attenuating layers 454 are positioned in parallel. Optionally, the attenuating layers 454 may be acutely angled with respect to each other.

A pair of filtering layers 452 extends from the back face 461. The filtering layers 452 extend substantially perpendicular to the front and back faces 459, 461. Optionally, the filtering layers 452 may extend at an acute angle to front and back faces 459, 461. The filtering layers 452 may be arranged at any angle with respect to one another. The filtering layers 452 extend between a pair of adjacent attenuating layers 454. The filtering layers 452 form an inner channel 462 to a perforated portion 464 of the back face 461. An attenuating cap 470 extends between the ends 472 of adjacent filtering layers 452. The attenuating cap 470 may represent interior wall or a semi-permeable membrane allowing air flow into the inner channel 462. The attenuating cap may be rounded, flat, pointed, concave, convex, and/or non-uniformly rounded.

Figure 18:
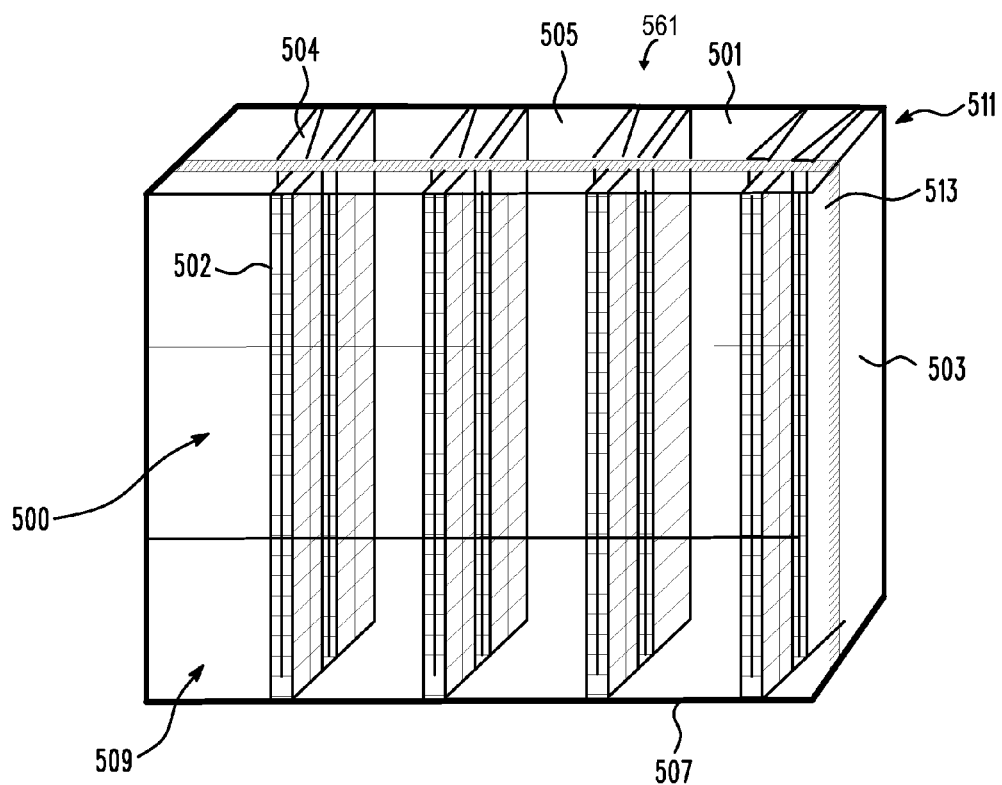
FIG. 18 is a perspective view of a filter/sound attenuation bank formed in accordance with an embodiment.

FIG. 18 illustrates a filter/sound attenuation bank housing 501 having a filter/sound attenuation bank 500. The housing 501 includes outer walls 503, a top 505, a bottom 507, a front face 509, and a back face 511. The front face 509 and at least a portion of the back face 511 are perforated to allow air to flow therethrough in the direction of arrows 504. Optionally, a coupling frame 513 extends along the outer walls 503 and the top 505. The filter/sound attenuation bank 500 includes attenuating layers 504 and filtering layers 502. The attenuating layers 504 and filtering layers 502 are coupled to the housing 501 and/or the coupling frame 513 to form an airtight interface.

Attenuating layers 504 extend at least partially between the front face 509 and the back face 511. In the exemplary embodiment, the attenuating layers 504 extend from the back face 511. Optionally, the attenuating layers 504 may extend from the front face 509. The attenuating layers 504 are arranged perpendicular to each of the front face 509 and the back face 511. Optionally, the attenuating layers 504 may extend at an acute angle with respect to the front and back faces 509, 511. The attenuating layers 504 are positioned in parallel. Optionally, the attenuating layers 504 may be acutely angled with respect to each other. Airflow is directed through the filtering layers 502 and through a channel 506 extending through the attenuating layers 504. Optionally, the attenuating layers 504 may represent interior walls that are semi-permeable and allow airflow therethrough. Optionally, the airflow is directed through the channel 506 to the filtering layers 502.

Filtering layers 502 extend at least partially from the front face 509. Optionally, the filtering layers extend at least partially from the back face 511. The filtering layers 502 extend substantially perpendicular to the front and back faces 509, 511. Optionally, the filtering layers 502 may extend at an acute angle to front and back faces 509, 511. The filtering layers 502 are arranged parallel to one another. Optionally, the filtering layers 502 may be arranged at an angle to one another. Each filtering layer 502 abuts an attenuating layer 504 to form an airtight interface. The filtering layers 502 direct airflow into the channel 506.

Figure 19:
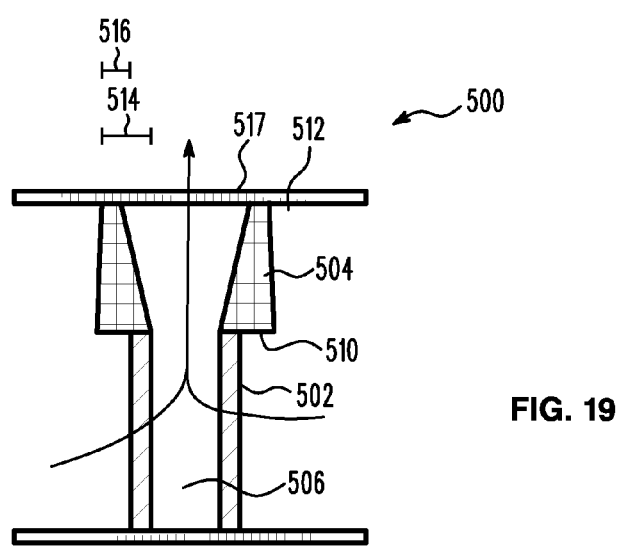
FIG. 19 is a top view of a filter/sound attenuation bank formed in accordance with an embodiment.

FIG. 19 illustrates a top view of the filter/sound attenuation bank 500. The filtering layers 502 abut the attenuating layers 504 to form the channel 506. The attenuating layers 504 and the filtering layers 502 are arranged perpendicular to each of the front face 509 and the back face 511. Optionally, the attenuating layers 504 and filtering layers 502 may extend at an acute angle with respect to the front and back faces 509, 511. The attenuating layers 504 and the filtering layers 502 are positioned in parallel. Optionally, the attenuating layers 504 and the filtering layers 502 may be acutely angled with respect to each other.

In the exemplary embodiment, the attenuating layers 504 have a front end 510 and a back end 512. The front end 510 has a width 514 that is greater than a width 516 of the back end 512. The channel 506 expands from the front face 509 to the back face 511. Optionally, the attenuating layers 504 may have a uniform width. Optionally, the attenuating layers may be rounded, flat, pointed, concave, convex, and/or non-uniformly rounded. The attenuating layers 504 and the filtering layers 502 form the channel 506. The channel 506 directs airflow to a perforated portion 517 of the back face 511.

Figure 20:
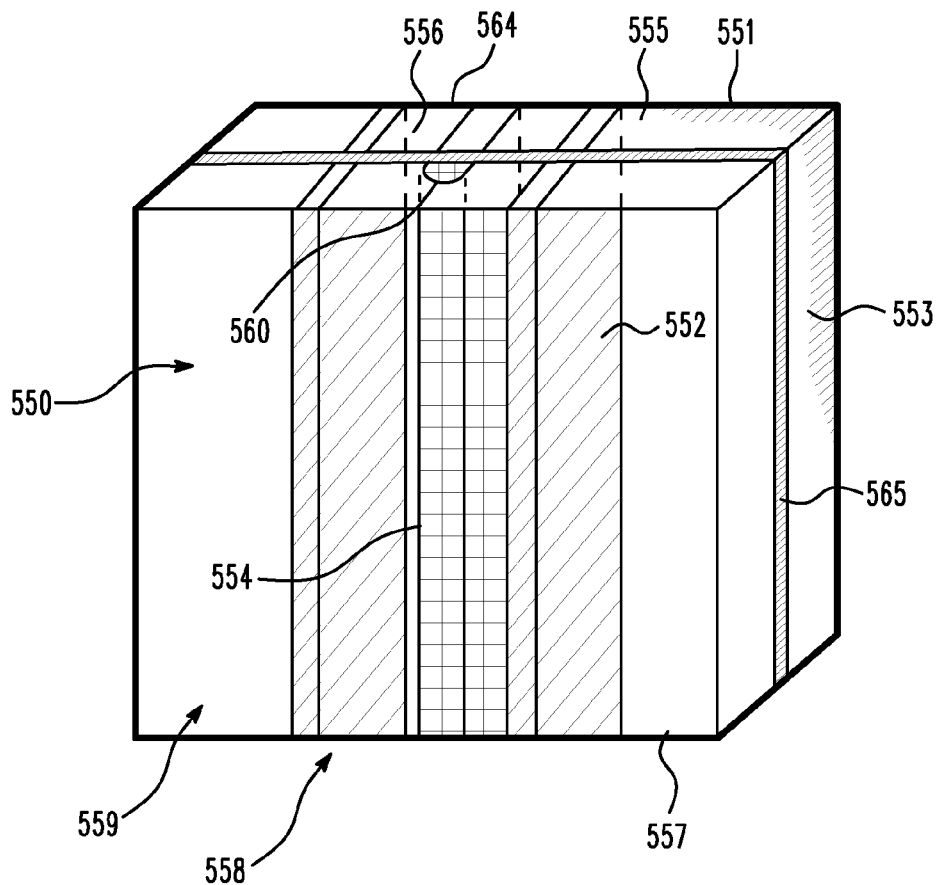
FIG. 20 is a perspective view of a filter/sound attenuation bank formed in accordance with an embodiment.

FIG. 20 illustrates a filter/sound attenuation bank housing 551 having a filter/sound attenuation bank 550. The housing 551 includes outer walls 553, a top 555, a bottom 557, a front face 559, and a back face 561. The front face 559 and at least a portion of the back face 561 are perforated to allow air to flow therethrough in the direction of arrows 558. Optionally, a coupling frame 563 extends along the outer walls 553 and the top 555. The filter/sound attenuation bank 550 includes attenuating layers 554 and filtering layers 552. The attenuating layers 554 and filtering layers 552 are coupled to the housing 551. Optionally, the attenuating layers 554 and the filtering layers 552 may be coupled to coupling frame 563 to form an airtight interface.

Filtering layers 552 extend at least partially between the front face 559 and the back face 561. The filtering layers 552 are arranged perpendicular to each of the front face 559 and the back face 561. Optionally, the filtering layers 552 may extend at an acute angle with respect to the front and back faces 559, 561. The filtering layers 552 are positioned in parallel. Optionally, the filtering layers 552 may be acutely angled with respect to each other. Airflow is directed through a channel 556 formed between the filtering layers 552 and through each filtering layer 552.

Attenuating layer 554 extends at least partially from the back face 561. Optionally, the attenuating layer 554 extends at least partially from the front face 559. The attenuating layer 554 extends substantially perpendicular to the front and back faces 559, 561. Optionally, the attenuating layer 554 may extend at an acute angle to front and back faces 559, 561. The attenuating layer 554 is arranged parallel to the filtering layers 552. Optionally, the attenuating layer 554 may be arranged at an angle with respect to the filtering layer 552. The attenuating layer 554 directs airflow through each of the filtering layers 552. Optionally, the attenuating layers 554 may represent interior walls that are semi-permeable and allow airflow therethrough.

Figure 21:
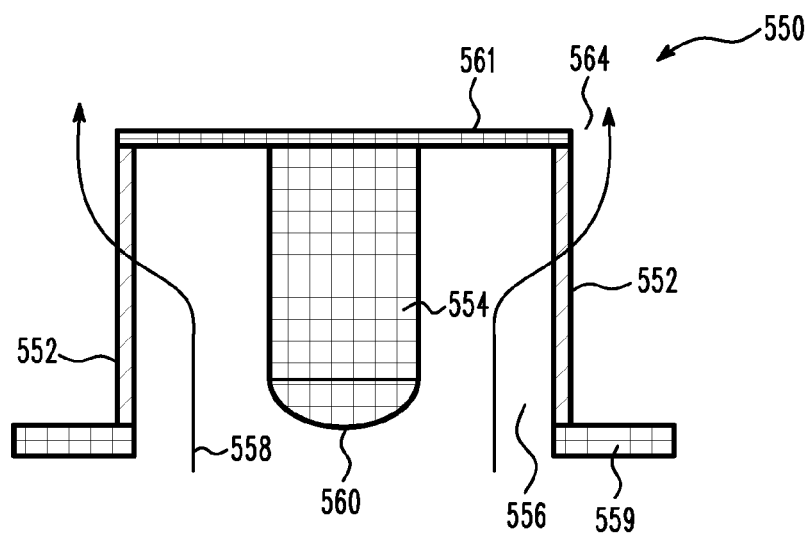
FIG. 21 is a top view of a filter/sound attenuation bank formed in accordance with an embodiment.

FIG. 21 illustrates a top view of the filter/sound attenuation bank 550. The filtering layers 552 form the channel 556. The attenuating layer 554 and the filtering layers 552 are arranged perpendicular to each of the front face 559 and the back face 561. Optionally, the attenuating layer 554 and filtering layers 552 may extend at an acute angle with respect to the front and back faces 559, 561. The attenuating layer 554 and the filtering layers 552 are positioned in parallel. Optionally, the attenuating layer 554 and the filtering layers 552 may be acutely angled with respect to each other.

In the exemplary embodiment, the attenuating layer 554 has a front end 560 and a back end 562. The back end 562 is coupled to the back face 561 to form an airtight interface. The front end 560 is rounded. Optionally, the front end 560 may be flat, pointed, concave, convex, and/or non-uniformly rounded. The filtering layers 552 form the channel 556. The channel 556 directs airflow to an opening 564 of the back face 561. Optionally, opening 564 may be a perforated portion of the back face 561.

Figure 22:
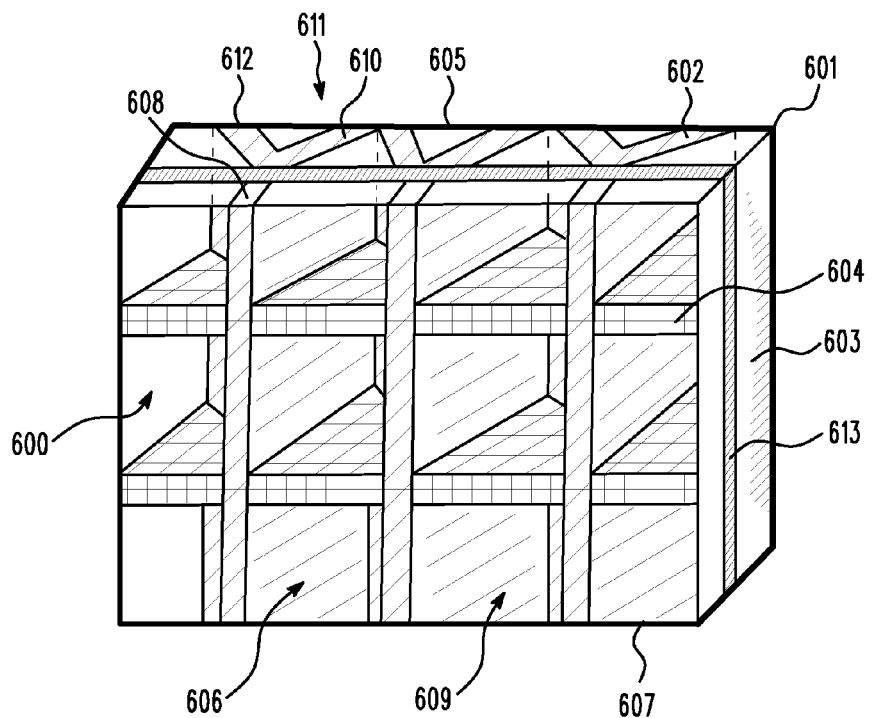
FIG. 22 is a perspective view of a filter/sound attenuation bank housing formed in accordance with an embodiment.

FIG. 22 illustrates a filter/sound attenuation bank housing 601 having a filter/sound attenuation bank 600. The housing 601 includes outer walls 603, a top 605, a bottom 607, a front face 609, and a back face 611. The front face 609 and at least a portion of the back face 611 are perforated to allow air to flow therethrough in the direction of arrows 606. Optionally, a coupling frame 613 extends along the outer walls 603 and the top 605. The filter/sound attenuation bank 600 includes attenuating layers 604 and filtering layers 602. The attenuating layers 604 and filtering layers 602 are coupled to the housing 601. Optionally, the attenuating layers 604 and the filtering layers 602 may be coupled to coupling frame 613 to form an airtight interface.

Figure 23:
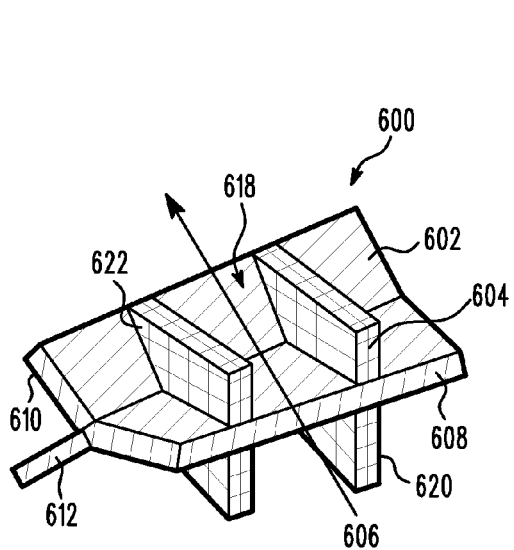
FIG. 23 is a perspective view of a filter/sound attenuation bank formed in accordance with an embodiment.

FIG. 23 illustrates a perspective view of the filter/sound attenuation bank 600. The filter/sound attenuation bank 600 includes a plurality of filtering layers 602 and a plurality of attenuating layers 604. The plurality of filtering layers 602 includes a plurality of upstream filtering layers 608, a plurality of first downstream filtering layers 610, and a plurality of second downstream filtering layers 612. Each filtering layer 602 includes an upstream end 614 and a downstream end 616. In the exemplary embodiment, the ends 614 and 616 are flat. Optionally, the ends 614 and 616 may be rounded, concave, convex, pointed, and/or non-uniformly rounded.

The downstream end 616 of upstream filtering layer 608 is positioned adjacent the upstream end 614 of each of the first and second downstream filtering layers 610 and 612. Optionally, these ends may be coupled and/or formed integrally to form an airtight interface. The first downstream filtering layer 610 extends from the upstream filtering layer 608 at an acute angle. The second downstream filtering layer 612 extends from the upstream filter layer 608 at an acute angle that is equal and opposite to the angle between the first downstream filtering layer 612 and the upstream filtering layer 608. Optionally, the two angles are not equal.

The attenuating layers 604 extend between the upstream filtering layer 608 and one of the first downstream filtering layer 610 and the second downstream filtering layer 612. Optionally, the attenuating layers 604 may extend between the first and second downstream attenuating layers 610 and 612. The attenuating layers 604 extend substantially perpendicular to the filtering layers 602. Optionally, the attenuating layers 604 may extend at an angle from the filtering layers 602. Adjacent attenuating layers 604 form air channels 618. Optionally, the attenuating layers 554 may represent interior walls that are semi-permeable and allow airflow therethrough.

Figure 24:
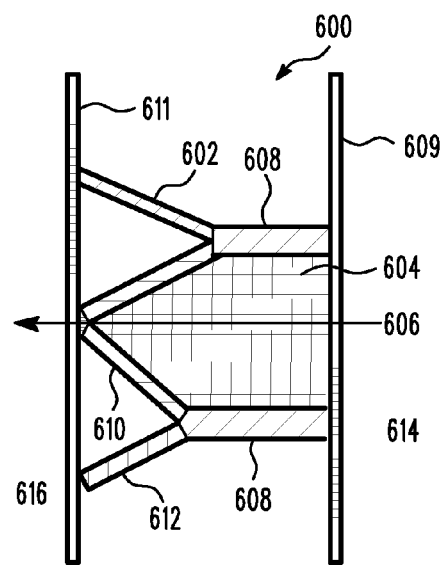
FIG. 24 is a side view of the filter/sound attenuation bank shown in FIG. 22.

FIG. 24 illustrates a top view of the filter/sound attenuation bank 600. The attenuating layer 604 form the channel 618. The attenuating layers 604 are arranged parallel to each of the front face 609 and the back face 611. Optionally, the attenuating layers 604 may extend at an acute angle with respect to the front and back faces 609, 611. The upstream filtering layer 608 is positioned perpendicular to the front and back face 609, 611. Optionally, the upstream filtering layers are positioned at an acute angle with respect to the front and back faces 609, 611. The first downstream filtering layer 610 and the second downstream filtering layer 612 are each positioned at an angle with respect to the front and back face 609, 611. Optionally, the first and second downstream filtering layers 610, 612 may extend parallel to the front and back faces 609, 611.

In the exemplary embodiment, the attenuating layer 604 has a front end 620 and a back end 622. The back end 622 is coupled to one of the filtering layers 602 to form an airtight interface. The front end 620 is rounded. Optionally, the front end 620 may be rounded, flat, pointed, concave, convex, and/or non-uniformly rounded. The attenuating layers 604 form the channel 618. The channel 618 directs airflow through an opening and/or perforated portion of the back face 611.

FIG. 25 is a perspective view of a damper 700 formed in accordance with an embodiment. The back draft damper 700 comprises a shell 705 which defines a central opening 702 having an inlet 701 and an outlet 703 through which air passes. The shell 705 is constructed to fit into a duct or passageway through which air flows, or be placed immediately upstream or downstream of a fan unit. The size of the shell 705 depends upon the size of the duct, passageway or fan unit. The shell 705 is constructed of 16 gauge sheet metal and has a lip located at the outlet 703 which engages an optional egg crate flow straightener 706. The shell 705 has a top 708, bottom 709 and sides 710. The shell 705 can be rectangular, elliptical, or round. The shell 705 can be fabricated from many types of materials and have different dimensions based on a particular application.

A plurality of vanes 712 extend between the top and bottom surfaces 708, 710 of the shell 705, The vanes 712 move between open positions, where air can flow substantially unimpeded through the central opening 702, and closed positions, dashed line, where air cannot flow through the central opening. The vanes 712 have top ends 713 and bottom ends 715, rounded leading edges 714 and sides 716 which converge to thinner trailing edges 718 resulting in a neutral aerodynamic shape which creates little drag due to air flowing over the vanes. The vanes 712 have a width which is less than or equal to the depth of the shell 705 and a length which is slightly less than the height of the shell 705. Optionally, the vanes 712 may have any size suitable for use with the shell 705. In the exemplary embodiment, the vanes 712 are configured as a solid attenuating layer. Optionally, the vanes 712 may be semi-permeable and allow airflow there through. Optionally, the vanes 712 may include filtering layers. Alternatively, the vanes 712 may be a combination of attenuating layers and filtering layers. A filter bank 720 is positioned at the outlet 703. Optionally, the filter bank 720 may be positioned at the inlet 701. The filter bank 720 is coupled to the shell 705 to form an airtight interface.

The vanes 712 are rotatably mounted in the shell 705 such that their axes of rotation 726 are slightly offset front to back from the vertical at an angle with the tops of the vanes 712 being closer to the inlet 701 than the bottoms of the vanes 712. The amount of offset depends on the size and weight of the vanes and the amount of airflow that will pass through the damper. The purpose of the offset is to cause gravity to rotate the vanes to their fully closed position when there is no positive airflow through the damper, much in the same manner that a refrigerator door closes. However, the offset should be as little as possible to obtain this result so that the vanes can rotate to their open positions quickly when there is any positive airflow through the shell. Moreover, it is desired to have the vanes become fully opened with as little airflow as possible.

FIG. 26 illustrates an attenuating filter 800 that may be used with the example embodiments above. The attenuating filtering includes an attenuating layer 804 and a filtering layer 802. The attenuating layer 804 has a front face 806 and a back face 808. The attenuating layer 804 is semi-permeable and allows airflow therethrough. In the exemplary embodiment, the filtering layer 802 extends along each side of the attenuating layer 804 to encase the attenuating layer 804 therein. Optionally, the filtering layer 802 extends along only one of the front face 806 and/or the back face 808 of the attenuating layer 804.

FIG. 27 illustrates an attenuating filter 850 that may be used with the example embodiments illustrated above. The attenuating filtering includes an attenuating layer 854 and a filtering layer 852. The attenuating layer 854 is semi-permeable and allows airflow therethrough. The filtering layer 852 has a front face 856 and a back face 858. In the exemplary embodiment, the attenuating layer 854 extends along each side of the filtering layer 852 to encase the filtering layer 852 therein. Optionally, the attenuating layer 854 extends along only one of the front face 856 and/or the back face 858 of the filtering layer 852.

Figure 28:
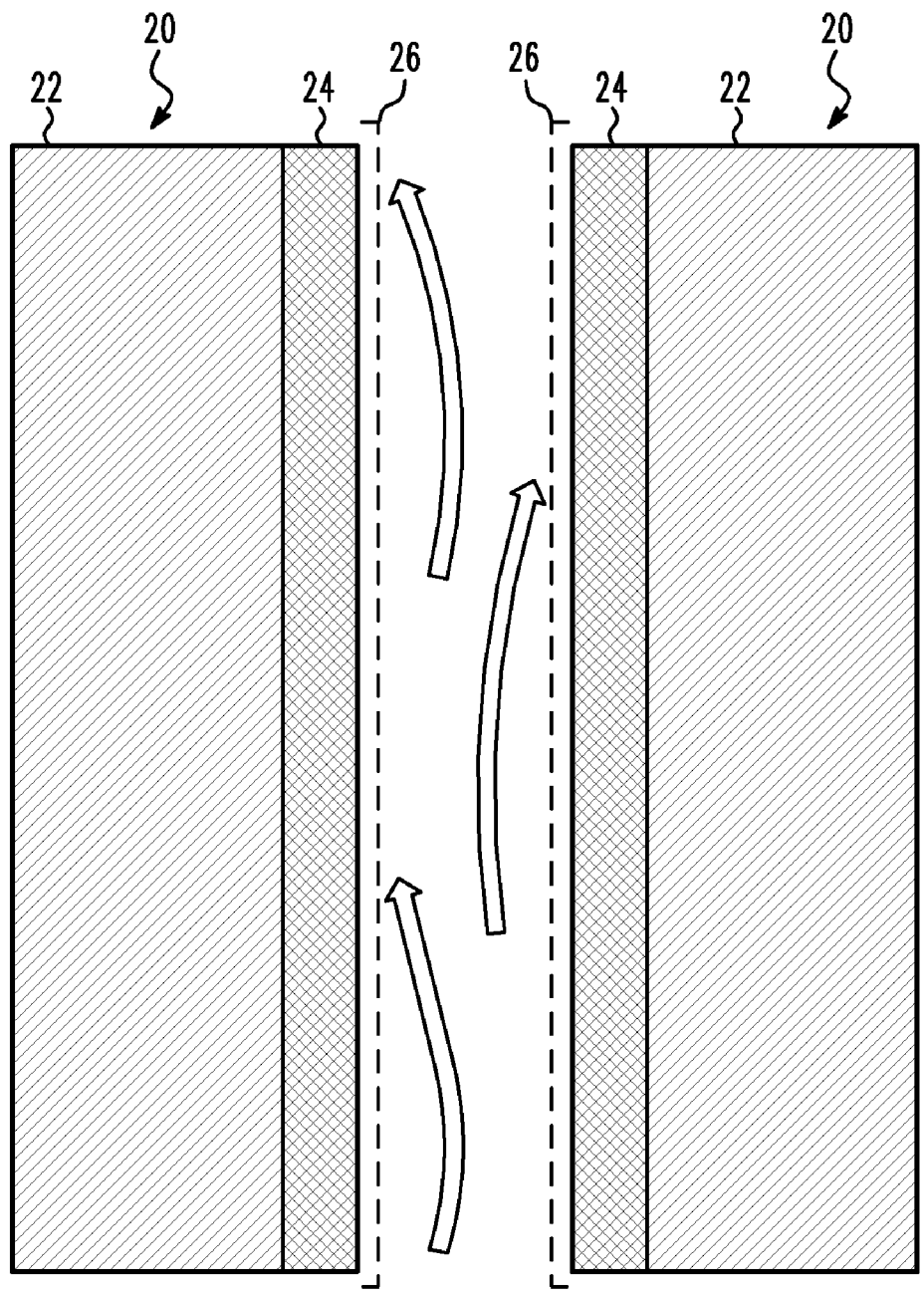
FIG. 28 is a side view of air flowing between insulation boards with an open cell foam facing in accordance with an embodiment, the insulation boards and open cell foam facing secured by perforated rigid facing.
Figure 32:
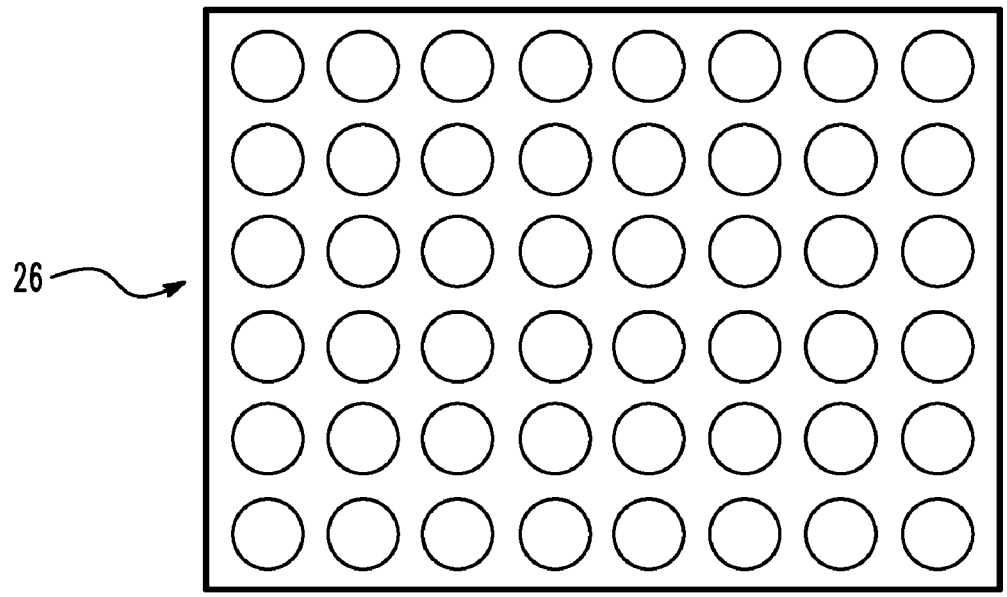
FIG. 32 is a front view of a perforated rigid facing having circular openings defined therein in accordance with an embodiment.
Figure 33:
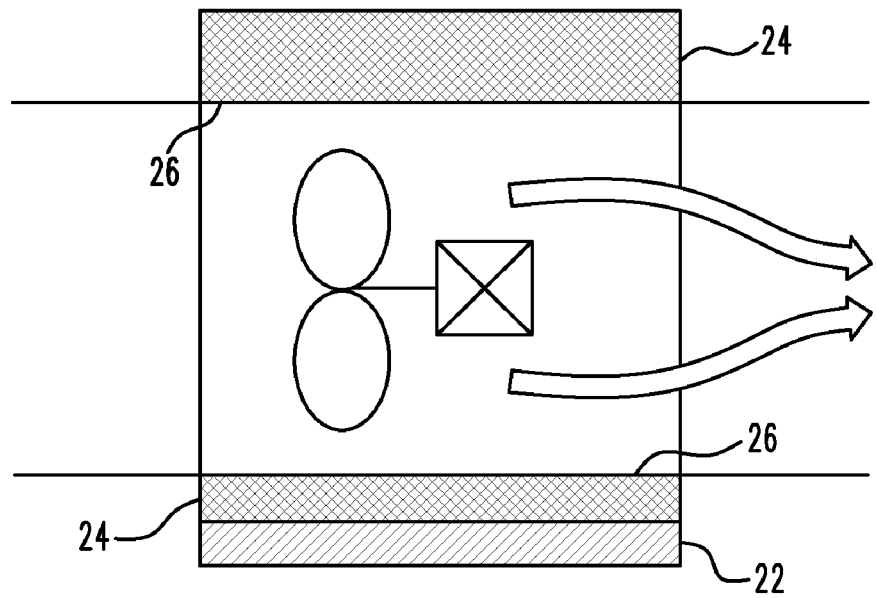
FIG. 33 is a side view of an exemplary air handler having a top section with open cell foam facing secured by perforated rigid facing and a bottom section with layered fiberglass and open cell foam facing secured by perforated rigid facing.
Figure 34:
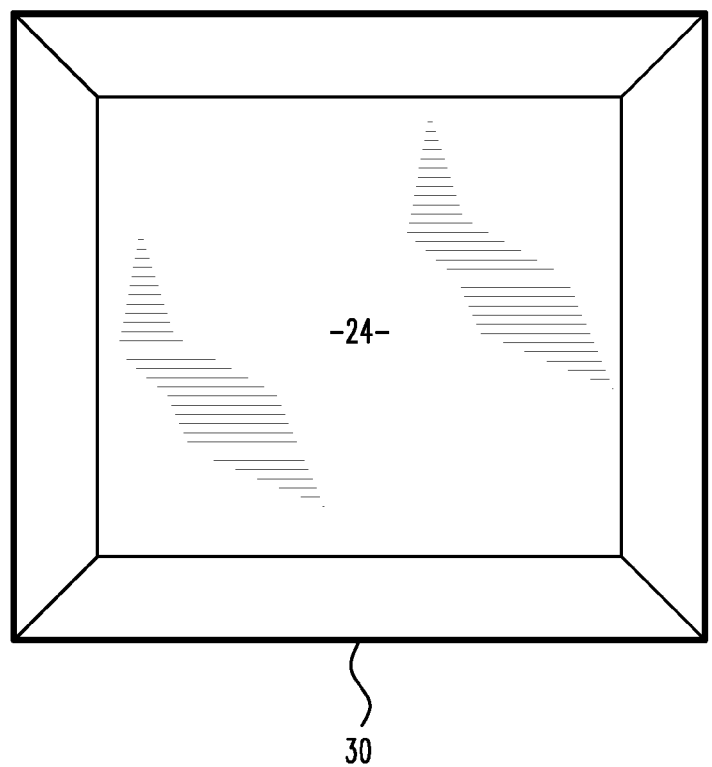
FIG. 34 is a front view of open cell foam facing secured by a frame.

FIG. 28 shows airflow between the two panels 20 which represent acoustically insulted surfaces and sound attenuation layers. FIGS. 28-30 show a first embodiment in which a fiberglass core 22 has an open cell foam 24 layered with at least one side of the fiberglass core 22. FIGS. 28 and 30-33 show a second embodiment combining the use of open cell foam 24 with for use of perforated rigid facing 26. FIGS. 33 and 34 show a third embodiment in which the entire insulation board is replaced with an uncoated open cell foam pad 24.

Turning first to the first embodiment shown in FIGS. 28-30, this layered embodiment includes a fiberglass core 22 (or other type of insulation) that has an open cell foam 24 layered with at least one side of the fiberglass core 22. One advantage to using both the fiberglass material and the open cell foam material is that it is less expensive than using open cell foam material alone because open cell foam more expensive than fiberglass. Another advantage to using both the fiberglass material and the open cell foam material is that it weighs less than using fiberglass material alone because fiberglass weighs more than open cell foam. Another advantage to using both the fiberglass material and the open cell foam material is that is that the two materials provide different types of acoustic insulation over a different range of frequencies. Together, the two materials provide sound absorption over greater range of frequencies. The graph below (shown with a vertical axis as the absorption coefficient going from 0 to 1 and a horizontal axis showing the frequency going from 0 to 10,000 Hz at approximately the peak point) is meant to be exemplary and does not necessarily reflect accurate measurements.

Alternative embodiments of the first layered embodiment include a fiberglass core 22 with one side layered with open cell foam 24 (FIG. 28), a fiberglass core 22 with both sides layered with open cell foam 24 (FIG. 29), and a fiberglass core 22 and layered with open cell foam 24 secured by perforated rigid facing 26 (FIG. 30). The bottom section of FIG. 33 shows the embodiment of FIG. 30 in use in an exemplary air handler. It should also be noted that an alternative embodiment could include more than two layers of different types of insulation. For example, a four layer version could be open cell foam, fiberglass, rockwool, and open cell foam. The layered embodiment could actually be "tuned" using different types of insulations, different quantities of insulations, and different thicknesses of insulations to have the desired acoustic properties for the intended use.

The embodiments described herein include a method for making an air handler using the panels and layers. The method includes the steps of providing an air handler system with at least one air handler surface, providing a core of first insulation material having at least one layering surface, and providing a facing of open cell foam second insulation material. Then, the facing is at least partially layered to the at least one layering surface to form a layered insulation board. Finally, the at least one air handler surface is at least partially covered with the layered insulation board so that the facing is exposed to airflow through the air handler.

Turning next to the second embodiment shown in FIGS. 28 and 30-33, this perf-secured embodiment combines the use of open cell foam 24 with for use of perforated rigid facing 26. Combining the use of open cell foam and perforated rigid facing provides significant advantages for use in air handlers. For example, the use of the perforated rigid facing 26 to secure the open cell foam 24 does not significantly reduce the sound absorption qualities of the open cell foam 24. As shown in FIG. 31, the open cell structure of the open cell foam 24 allows portions of the open cell foam 24 to protrude from openings defined in the perforated rigid facing 26 (shown in front view in FIG. 32). The exposed open cell foam 24 is able to absorb sound waves. In one embodiment, protruding open cell foam 24 formed between the openings in the perforated rigid facing 26 absorbs sound waves. This can be compared to prior art embodiments in which sound waves are reflected by the substantially rigid diaphragms formed by the smooth facing being divided by the perforated rigid facing.

Alternative embodiments of the second perf-secured embodiment include a fiberglass core 22 and layered with open cell foam 24 secured by perforated rigid facing 26 (FIG. 30) and non-layered open cell foam 24 secured by perforated rigid facing 26 (the bottom section of FIG. 33). It should be noted that alternative embodiments may replace perforated rigid facing 26 shown in FIG. 32 with alternative securing structure such as perforated rigid facing 26 with alternatively shaped openings, straps, netting, wire grids, or other securing structure suitable to prevent the open cell foam 24 from being drawn inward.

The embodiments described herein include a method for making an air handler using the perf-secured embodiment. The method includes the steps of providing an air handler system with at least one air handler surface, providing open cell foam insulation material, and providing securing structure through which said facing may be exposed. Then, the at least one air handler surface is at least partially covered with the open cell foam insulation material. Finally, the open cell foam insulation material is secured to the at least one air handler surface so that the protruding open cell foam insulation material is exposed to sound waves and/or airflow through the air handler.

Turning next to the third preferred embodiment shown in FIGS. 33 and 34, in this uncoated embodiment combines the entire insulation board is replaced with uncoated open cell foam 24. This would be particularly suitable for uses in which the presence of fiberglass would not be satisfactory for the intended use or would be unacceptable to the intended client. For example, pharmaceutical companies involved in ingestible or injectable drugs would find it unacceptable to have any fiberglass in the air handler. Alternative embodiments of the second uncoated embodiment include uncoated open cell foam 24 secured by perforated rigid facing 26 (FIG. 33) uncoated open cell foam 24 secured in a frame 30 (FIG. 34).

Figure 35:
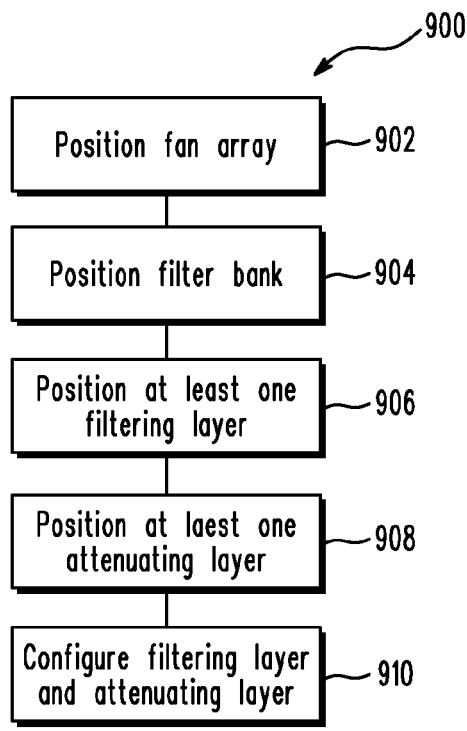
FIG. 35 is a flowchart illustrating a method in accordance with an embodiment.

FIG. 35 is a flowchart of a method 900 for forming an air handling unit 100. At 902, a fan array is positioned within the air handling unit. The fan array is configured to channel air through the air handling unit. At 904, a filter bank is positioned within the air handling unit to filter the air flowing therethrough. The filter bank may be positioned upstream and/or downstream from the fan array. Positioning the filter bank includes positioning at least one filtering layer, at 906. At 908, at least one attenuating layer is positioned adjacent the filtering layer. Optionally, the attenuating layer may abut the filtering layer. Additionally, the attenuating layer may be coupled to the filtering layer. At 910, the filtering layers and attenuating layers are arranged using at least one of the configurations shown in FIGS. 4-25.

The embodiments described herein are described with respect to an air handling system. It should be noted that the embodiments described may be used within the air handling unit and/or in the inlet or discharge plenum of the air handling system. The embodiments may also be used upstream and/or downstream of the fan array within the air handling unit. Optionally, the described embodiments may be used in a clean room environment. The embodiments may be positioned in the discharged plenum and/or the return chase of the clean room. Optionally, the embodiments may be used in residential HVAC systems. The embodiments may be used in the ducts of an HVAC system. Optionally, the embodiments may be used with precision air control systems, DX and chilled-water air handlers, data center cooling systems, process cooling systems, humidification systems, and factory engineered unit controls. Optionally, the embodiments may be used with commercial and/or residential ventilation products. The embodiments may be used in the hood and/or inlet of the ventilation product. Optionally, the embodiment may be positioned downstream of the inlet in a duct and/or at a discharge vent.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:
1. A filter bank, comprising:
 a housing having walls extending between a front face and a back face, an air channel formed between the walls, wherein air flows through the air channel along an air flow path from the front face to the back face;
 a filtering layer held in the air channel of the housing, the filtering layer oriented between the front and back faces such that air flows through the filtering layer before discharging from the back face; and an attenuating layer including opposed side walls, the attenuating layer positioned within the air channel and spaced apart from the walls of the housing such that air flows in a common direction along both sides of the opposed side walls, the attenuating layer configured to attenuate sound as the sound propagates between the front and back faces, the attenuating layer oriented to extend along the air flow direction.

2. The filter bank of claim 1, wherein the attenuating layer includes multiple attenuating layers arranged adjacent and spaced apart from one another, the air flow path traveling between the multiple attenuating layers.

3. The filter bank of claim 1, wherein the attenuating layer at least in part defines the air flow path through the air channel, the filtering layer traversing the air flow path such that air flow through the air flow path passes through the filtering layer.

4. The filter bank of claim 1, wherein the attenuating layer comprises a porous medium configured to absorb sound.

5. The filter bank of claim 1, wherein the filtering layer comprises a filtration medium comprising at least one of foam, pleated paper, and spun fiberglass.

6. The filter bank of claim 1, wherein the filtering layer is coupled to the attenuating layer.

7. The filter bank of claim 1, wherein the filtering layer is positioned in series with the attenuating layer.

8. The filter bank of claim 1, wherein the filtering layer is positioned in parallel with the attenuating layer.

9. The filter bank of claim 1 further comprising:
a pair of first attenuating layers, each coupled to the filtering layer; and
a second attenuating layer positioned between the pair of first attenuating layers.

10. The filter bank of claim 1, wherein the attenuating layer extends at an angle from the filtering layer.

11. The filter bank of claim 1 further comprising a pair of attenuating layers forming the air flow path therebetween, the filtering layer positioned within the air flow path.

12. The filter bank of claim 1 further comprising a pair of filtering layers forming the air flow path, the attenuating layer positioned between the pair of filtering layers.

13. The filter bank of claim 1, wherein an end of the filtering layer is coupled to an end of the attenuating layer.

14. The filter bank of claim 1, wherein the filtering layer and the attenuating layer are configured in a three-dimensional array.

15. An air handling unit comprising:
a fan for drawing an air flow path through the air handling unit; and
a filter bank for filtering the air flow path, the filter bank comprising:
a housing having walls extending between a front face and a back face, an air channel formed between the walls, wherein air flows along the air flow path through the air channel from the front face to the back face;
a filtering layer held in the air channel of the housing, the filtering layer oriented between the front and back faces such that air flows through the filtering layer before discharging from the back face; and
an attenuating layer including opposed side walls, the attenuating layer positioned within the air channel and spaced apart from the walls of the housing such that air flows in a common direction along both sides of the opposed side walls, the attenuating layer configured to attenuate sound as the sound propagates between the front and back faces, the attenuating layer oriented to extend along the air flow direction.

16. The air handling unit of claim 15, wherein the filtering layer is coupled to the attenuating layer.

17. The air handling unit of claim 15, wherein the filtering layer and the attenuating layer are positioned upstream from the fan.

18. The air handling unit of claim 15, wherein the filtering layer and the attenuating layer define the air flow path.

19. The air handling unit of claim 15, wherein the attenuating layer includes multiple attenuating layers arranged adjacent and spaced apart from one another, the air flow path traveling between the multiple attenuating layers.

20. The air handling unit of claim 15, wherein the attenuating layer at least in part defines the air flow path, the filtering layer traversing the air flow path such that air flow through the air flow path passes through the filtering layer.

21. The air handling unit of claim 15, wherein the attenuating layer comprises a porous medium configured to absorb sound.

22. The air handling unit of claim 15, wherein the filtering layer comprises a filtration medium comprising at least one of foam, pleated paper, and spun fiberglass.

23. A method of filtering and attenuating sound within an air handling unit, said method comprising:
positioning a housing having walls extending between a front face and a back face within the air handling unit, the walls defining an air channel through at least a portion of the air handling unit, wherein air flows along an air flow path from the front face to the back face;
coupling a filtering layer within the air channel of the housing, the filtering layer oriented between the front and back faces such that air flows through the filtering layer before discharging from the back face; and
positioning an attenuating layer having opposed side walls within the air channel and spaced apart from the walls of the housing such that air flows in a common direction along both sides of the opposed side walls, the attenuating layer configured to attenuate sound as the sound propagates between the front and back faces, the attenuating layer oriented to extend along the air flow direction.

24. The method of claim 23 further comprising coupling the filtering layer to the attenuating layer.

25. The method of claim 23 further comprising positioning the filtering layer and the attenuating layer to form the air flow path.

26. The method of claim 23 further comprising positioning the filtering layer and the attenuating layer in a three-dimensional array.

27. The method of claim 23 further comprising positioning the filtering layer and the attenuating layer in series.

28. The method of claim 23 further comprising positioning the filtering layer and the attenuating layer in parallel.

29. The method of claim 23 further comprising arranging multiple attenuating layers adjacent and spaced apart from one another, the air flow path traveling between the multiple attenuating layers.

30. The method of claim 23 further comprising positioning the attenuating layer to at least in part define the air flow path through the air channel, the filtering layer traversing the air flow path such that air flow through the air flow path passes through the filtering layer.

31. The method of claim 23 further comprising forming the attenuating layer from a porous medium configured to absorb sound.

32. The method of claim 23 further comprising forming the filtering layer from a filtration medium comprising at least one of foam, pleated paper, and spun fiberglass.

33. The filter bank of claim 1, wherein the attenuating layer is located at an intermediate position within the air channel and positioned spaced apart from the walls.

34. The filter bank of claim 1 further comprising:
multiple filtering layers; and
an attenuating layer positioned between each adjacent filtering layer.

35. The filter bank of claim 1, wherein an attenuating layer forms at least one of the walls.

36. The air handling unit of claim 15, wherein the attenuating layer is located at an intermediate position within the air channel and positioned spaced apart from the walls.

37. The air handling unit of claim 15 further comprising:
multiple filtering layers; and
an attenuating layer positioned between each adjacent filtering layer.

38. The air handling unit of claim 15, wherein an attenuating layer forms at least one of the walls.

39. The method of claim 23 further comprising positioning the attenuating layer at an intermediate position within the air channel and spaced apart from the walls.

40. The method of claim 23 further comprising:
coupling multiple filtering layers within the housing; and
positioning an attenuating layer between each adjacent filtering layer.

41. The method of claim 23 further comprising forming at least one of the walls with an attenuating layer.

* * * * *